United States Patent
Bak et al.

(10) Patent No.: US 10,761,876 B2
(45) Date of Patent: Sep. 1, 2020

(54) FASTER ACCESS OF VIRTUAL MACHINE MEMORY BACKED BY A HOST COMPUTING DEVICE'S VIRTUAL MEMORY

(71) Applicant: Microsoft Technology Licensing, LLC, Redmond, WA (US)

(72) Inventors: Yevgeniy Bak, Redmond, WA (US); Mehmet Iyigun, Krikland, WA (US); Arun U. Kishan, Krikland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/423,137

(22) Filed: May 27, 2019

(65) Prior Publication Data
US 2020/0159558 A1 May 21, 2020

Related U.S. Application Data

(63) Continuation-in-part of application No. 16/198,620, filed on Nov. 21, 2018.

(51) Int. Cl.
*G06F 3/06* (2006.01)
*G06F 9/455* (2018.01)
(Continued)

(52) U.S. Cl.
CPC ........ *G06F 9/45558* (2013.01); *G06F 12/109* (2013.01); *G06F 12/1063* (2013.01); *G06F 2009/45583* (2013.01); *G06F 2212/50* (2013.01)

(58) Field of Classification Search
CPC .......................................................... G06F 3/06
(Continued)

(56) References Cited

U.S. PATENT DOCUMENTS

| | | | | |
|---|---|---|---|---|
| 10,447,728 B1* | 10/2019 | Steinberg | ................ | G06F 21/00 |
| 2006/0206687 A1* | 9/2006 | Vega | ........................ | G06F 12/10 |
| | | | | 711/206 |

(Continued)

OTHER PUBLICATIONS

"AMO I/O Virtualization Technology (IOMMU) Specification—PID 34434—Rev 1.26", Retrieved from: http://support.amd.com/de/Embedded_TechDocs/34434-IOMMU-Rev_126_2-11-09.pdf, Feb. 1, 2009, 90 pages.

(Continued)

*Primary Examiner* — Titus Wong
(74) *Attorney, Agent, or Firm* — Watson Patents, PLC; Vladan M. Vasiljevic

(57) ABSTRACT

To increase the speed with which the hierarchical levels of a Second Layer Address Table (SLAT) are traversed as part of a memory access where the guest physical memory of a virtual machine environment is backed by virtual memory assigned to one or more processes executing on a host computing device, one or more hierarchical levels of tables within the SLAT can be skipped or otherwise not referenced. While the SLAT can be populated with memory correlations at hierarchically higher-levels of tables, the page table of the host computing device, supporting the host computing device's provision of virtual memory, can maintain a corresponding contiguous set of memory correlations at the hierarchically lowest table level, thereby enabling the host computing device to page out, or otherwise manipulate, smaller chunks of memory. If such manipulation occurs, the SLAT can be repopulated with memory correlations at the hierarchically lowest table level.

20 Claims, 9 Drawing Sheets

(51) Int. Cl.
*G06F 12/1045* (2016.01)
*G06F 12/109* (2016.01)
(58) Field of Classification Search
USPC ......................................................... 711/207
See application file for complete search history.

(56) References Cited

U.S. PATENT DOCUMENTS

| | | | |
|---|---|---|---|
| 2007/0168643 A1 | 7/2007 | Hummel et al. | |
| 2009/0070545 A1 | 3/2009 | Stecher | |
| 2009/0182976 A1 | 7/2009 | Agesen | |
| 2012/0110236 A1 | 5/2012 | Ali et al. | |
| 2014/0040529 A1 | 2/2014 | Grisenthwaite | |
| 2015/0248554 A1* | 9/2015 | Dumitru | G06F 9/45558 726/1 |
| 2015/0356023 A1* | 12/2015 | Peter | G06F 9/45533 711/208 |
| 2015/0363326 A1 | 12/2015 | Baskakov et al. | |
| 2015/0378930 A1* | 12/2015 | Sahita | G06F 12/1009 711/207 |
| 2016/0299712 A1 | 10/2016 | Kishan et al. | |
| 2017/0123996 A1* | 5/2017 | Kishan | G06F 9/45558 |
| 2017/0308484 A1* | 10/2017 | Lutas | G06F 21/554 |

OTHER PUBLICATIONS

Navarro, et al., "Practical, Transparent Operating System Support for Superpages", In Proceedings of ACM SIGOPS Operating Systems Review, vol. 36, Issue SI, Dec. 31, 2002, pp. 89-104.

"International Search Report and Written Opinion Issued in PCT Application No. PCT/US19/061345", dated Feb. 21, 2020, 14 Pages.

"Non Final Office Action Issued in U.S. Appl. No. 16/198,620", dated May 11, 2020, 09 Pages.

\* cited by examiner

FASTER ACCESS OF VIRTUAL MACHINE MEMORY BACKED BY A HOST COMPUTING DEVICE'S VIRTUAL MEMORY

CROSS-REFERENCE TO RELATED APPLICATIONS

This application claims the benefit of and priority to U.S. patent application Ser. No. 16/198,620 filed on Nov. 21, 2018 and entitled "Faster Computer Memory Access By Reducing SLAT Fragmentation," which application is expressly incorporated herein by reference in its entirety.

BACKGROUND

Modern computing devices operate by executing computer-executable instructions from high-speed volatile memory in the form of random access memory (RAM), and the execution of such computer executable instructions often entails the reading of data from RAM. Due to cost, physical size limitations, power requirements, and other like constraints, computing devices typically comprise less RAM than is required by the processes that are typically executed on such computing devices. To accommodate such constraints, virtual memory is utilized, whereby the memory that appears to be available to processes executing on a computing device is greater than the physical memory circuitry provides for. The relationship between virtual memory and physical memory is typically managed by one or more memory managers, which implement, maintain, and/or reference a "page table" whose information delineates the relationship between one or more virtual memory addresses and the locations of corresponding data, either in physical memory, or on some form of storage media. To accommodate the quantities of memory relevant to modern computing devices and the processes executed thereon, a modern page table is typically comprised of multiple hierarchical levels of tables, with a hierarchically higher-level table having entries that each identify a different hierarchically lower-level table, and with the hierarchically lowest-level table comprising entries that do not identify a still further table, but rather identify the memory addresses themselves.

Among the processes that can be executed by computing devices are processes that virtualize, or abstract, the underlying hardware of the computing device. Such processes include virtual machines, which can simulate a complete underlying computing device to processes executed within the virtualized computing context provided by such virtual machines. A hypervisor, or similar set of computer-executable instructions, can facilitate the provision of a virtual machine by virtualizing, or abstracting, the underlying hardware of a physical computing device hosting such a hypervisor. A hypervisor can maintain a Second Layer Address Table (SLAT) which can also be hierarchically arranged in a manner analogous to the aforementioned page tables. The SLAT can maintain information that delineates the relationship between one or more memory addresses that appeared to be physical memory locations to processes executing on top of the hypervisor, including processes executing within the context of a virtual machine whose virtualization of underlying computing hardware is facilitated by the hypervisor, and the memory locations of actual physical memory itself.

When a process executing within the context of a virtual machine, for example, accesses memory, two different lookups can be performed. One lookup can be performed within the virtual machine context itself to correlate the virtual memory address requested with a physical memory address. Because such a lookup is performed within the virtual machine context itself, the identified physical memory address is only a physical memory address as perceived by processes executing within the context of the virtual machine. Such a lookup can be performed by a memory manager executing within the context of the virtual machine and can be made with reference to a page table that exists within the context of the virtual machine. A second lookup can then be performed outside of the context of the virtual machine. More specifically, the physical memory address (within the context of the virtual machine) identified by the first lookup, can be correlated to an actual physical memory address. Such a second lookup can entail one or more processing units of the computing device referencing the SLAT, which can correlate perceived physical memory addresses with actual physical memory addresses.

As indicated, both page tables and the SLAT can be hierarchical arrangements of different hierarchical levels of tables. Thus, the performance of a table lookup, whether performed by the memory manager with reference to the page table, or whether performed by the hypervisor with reference to the SLAT, can entail determining an appropriate table entry within a highest hierarchical table level, referencing a hierarchically lower-level table that is identified by that table entry, determining an appropriate table entry within that hierarchically lower-level table, referencing a hierarchically still lower-level table that is identified by that table entry, and so on, until a lowest hierarchical level table is reached, whereupon the individual entries of that lowest hierarchical level table identify one or more specific addresses, or ranges of addresses, of memory itself, as supposed to identifying a still further table. Each reference to a hierarchically lower-level table consumes processor cycles and increases the duration of a memory access.

In the case of a memory access from a process executing within the context of a virtual machine, for example, the duration of such a memory access can include both the traversing of the hierarchical levels of the page table, performed by the memory manager, in the context of the virtual machine, and, in addition, the traversing of the hierarchical levels of the SLAT performed by the hypervisor. The additional delay introduced by the lookup performed by the hypervisor, with reference to the SLAT, renders memory access from processes executing within the context of a virtual machine, or, indeed, any process that accesses memory through a hypervisor, more inefficient as compared with processes accessing memory more directly. Such inefficiencies can discourage users from achieving the security benefits, and other benefits conferred by accessing memory through a hypervisor.

SUMMARY

To increase the efficiency of memory utilization by virtual machine processes executing on a host computing device, those virtual machine processes can be backed by the host's virtual memory, thereby enabling traditional virtual memory efficiencies to apply to the memory consumed by such virtual machine processes. To increase the speed with which the hierarchical levels of a Second Layer Address Table (SLAT) are traversed as part of a memory access in such an environment where the guest physical memory of the virtual machine environment is backed by virtual memory assigned to one or more processes executing on a host computing device, one or more hierarchical levels of tables within the SLAT can be skipped or otherwise not referenced, thereby resulting in more efficient SLAT traversal and more efficient memory access. While the SLAT can be populated with memory correlations at hierarchically higher-levels of tables, the page table of the host computing device, supporting the host computing device's provision of virtual memory, can maintain a corresponding contiguous set of memory correlations at the hierarchically lowest table level, thereby enabling the host computing device to page out, or otherwise manipulate, smaller chunks of memory. If such manipulation occurs, the SLAT can be repopulated with memory correlations at the hierarchically lowest table level. Conversely, if the host can reassemble a sufficiently large contiguous set of small pages, the SLAT can again be populated with a correlation at hierarchically higher-levels of tables, thereby again resulting in more efficient SLAT traversal and more efficient memory access. In such a manner, more efficient SLAT traversal can be achieved while maintaining the memory utilization efficiency benefits of backing virtual machine processes with a host computing device's virtual memory.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
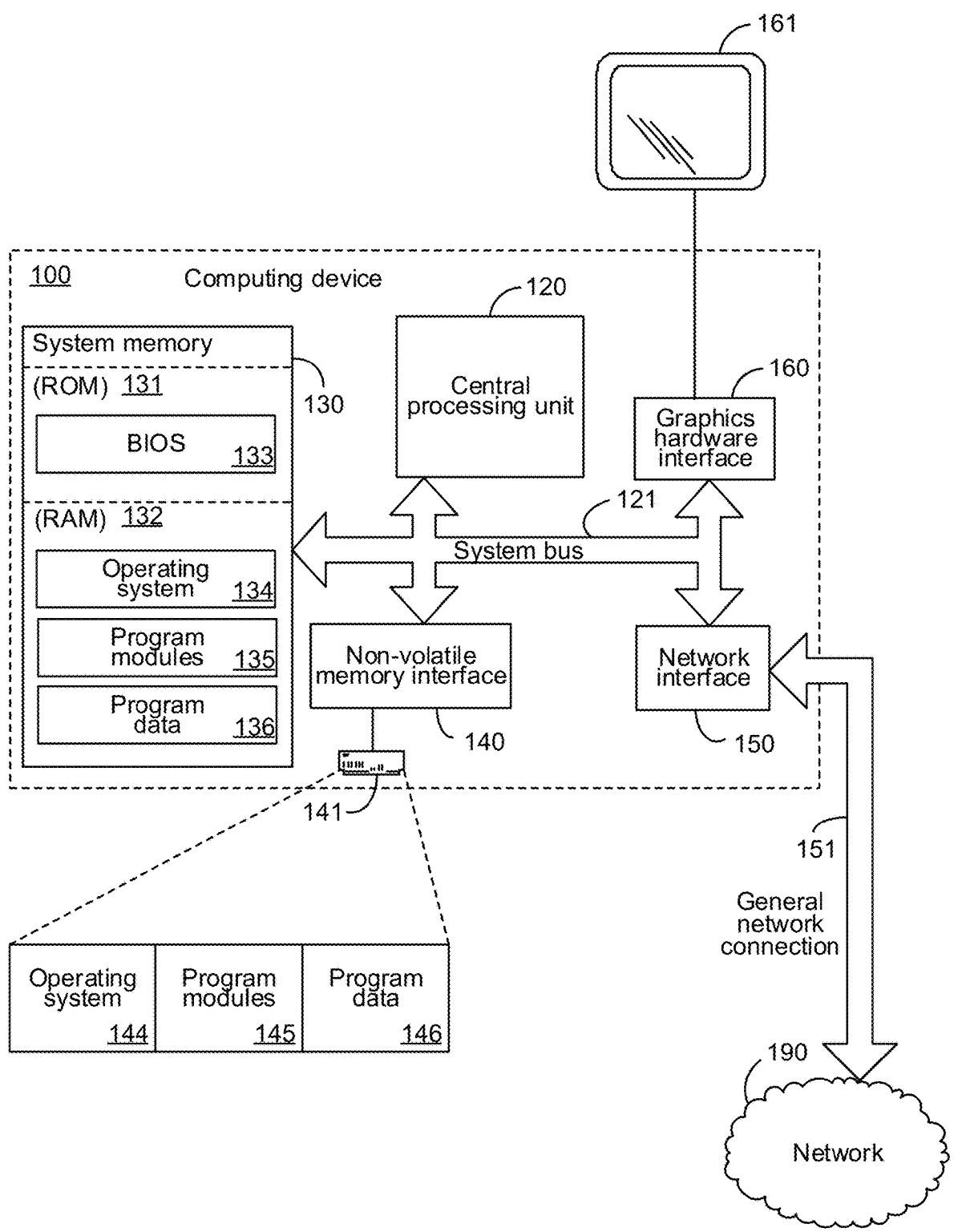
FIG. 1 is a block diagram of an exemplary computing device

The following description relates to increasing the efficiency of memory access while simultaneously providing for more efficient memory utilization on computing devices hosting one or more virtual machine processes that provide virtual machine computing environments. To increase the efficiency of memory utilization by virtual machine processes executing on a host computing device, those virtual machine processes can be backed by the host's virtual memory, thereby enabling traditional virtual memory efficiencies to apply to the memory consumed by such virtual machine processes. To increase the speed with which the hierarchical levels of a Second Layer Address Table (SLAT) are traversed as part of a memory access in such an environment where the guest physical memory of the virtual machine environment is backed by virtual memory assigned to one or more processes executing on a host computing device, one or more hierarchical levels of tables within the SLAT can be skipped or otherwise not referenced, thereby resulting in more efficient SLAT traversal and more efficient memory access. While the SLAT can be populated with memory correlations at hierarchically higher-levels of tables, the page table of the host computing device, supporting the host computing device's provision of virtual memory, can maintain a corresponding contiguous set of memory correlations at the hierarchically lowest table level, thereby enabling the host computing device to page out, or otherwise manipulate, smaller chunks of memory. If such manipulation occurs, the SLAT can be repopulated with memory correlations at the hierarchically lowest table level. Conversely, if the host can reassemble a sufficiently large contiguous set of small pages, the SLAT can again be populated with a correlation at hierarchically higher-levels of tables, thereby again resulting in more efficient SLAT traversal and more efficient memory access. In such a manner, more efficient SLAT traversal can be achieved while maintaining the memory utilization efficiency benefits of backing virtual machine processes with a host computing device's virtual memory.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including servers, hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Before proceeding with a detailed description of the memory allocation and access mechanisms referenced above, a detailed description of an exemplary host computing device, which provides context for the descriptions below, is provided with reference to the exemplary computing device 100 shown in FIG. 1. The exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. The computing device 100 can optionally include graphics hardware, including, but not limited to, a graphics hardware interface 160 and a display device 161, which can include display devices capable of receiving touch-based user input, such as a touch-sensitive, or multi-touch capable, display device. Depending on the specific physical implementation, one or more of the CPUs 120, the system memory 130 and other components of the computing device 100 can be physically co-located, such as on a single chip. In such a case, some or all of the system bus 121 can be nothing more than silicon pathways within a single chip structure and its illustration in FIG. 1 can be nothing more than notational convenience for the purpose of illustration.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 100. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer content between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, other program modules 135, and program data 136.

The computing device 100 may also include other removable/non-removable, volatile/nonvolatile computer storage media. By way of example only, FIG. 1 illustrates a hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 141 is typically connected to the system bus 121 through a non-volatile memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

The computing device 100 may operate in a networked environment using logical connections to one or more remote computers. The computing device 100 is illustrated as being connected to the general network connection 151 (to a network 190) through a network interface or adapter 150, which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 161. It will be appreciated that the network connections shown are the exemplary and other means of establishing a communications link between computing devices may be used.

Although described as a single physical device, the exemplary computing device 100 can be a virtual computing device, in which case the functionality of the above-described physical components, such as the CPU 120, the system memory 130, the network interface 160, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 100 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

Figure 2:
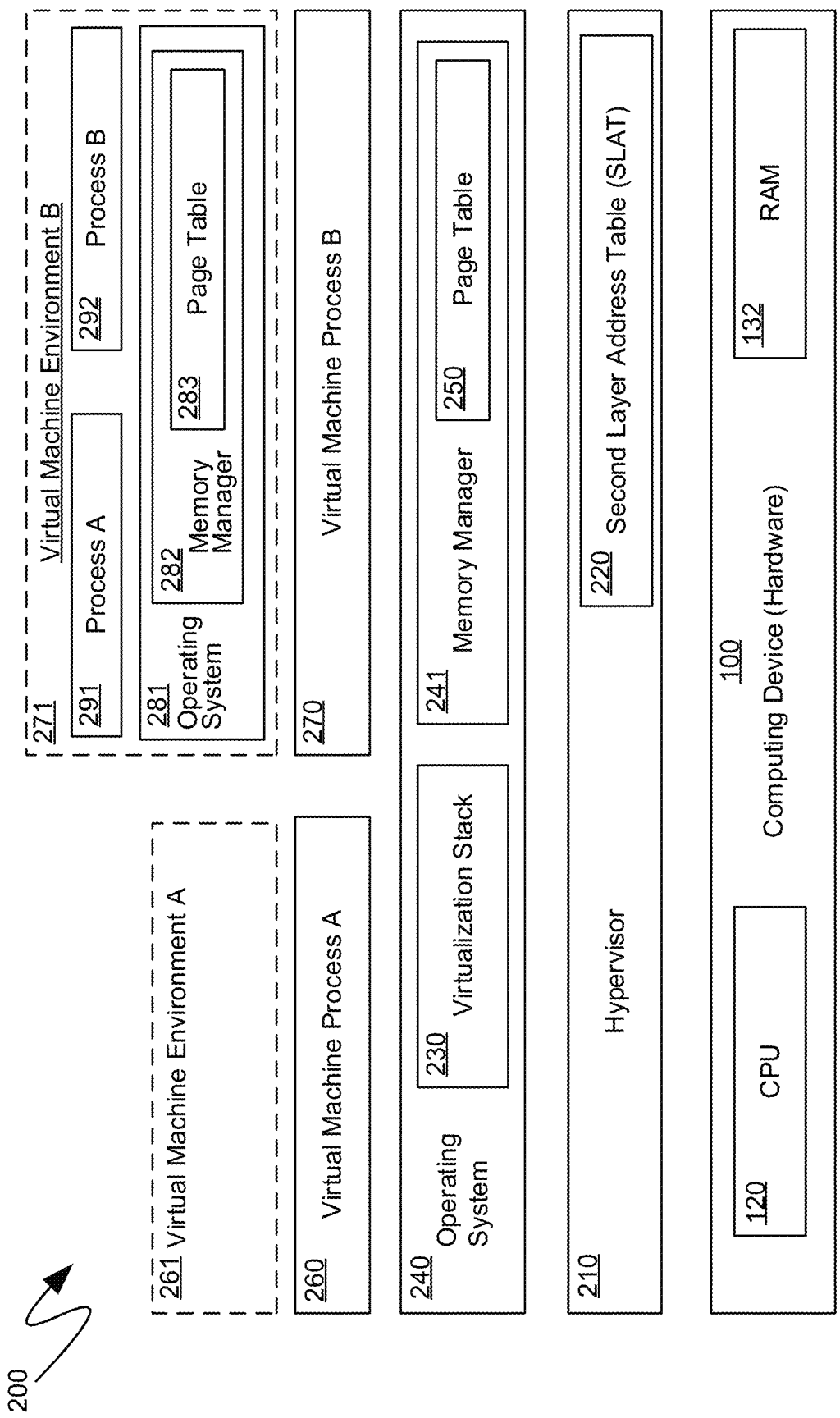
FIG. 2 is a system diagram of an exemplary hardware and software computing system.

Turning to FIG. 2, the system 200 shown therein illustrates a computing system comprising both computing device hardware and processes being executed thereon. More specifically, the exemplary system 200 shown in FIG. 2 includes computing device hardware itself, such as the aforementioned processing units 120 and RAM 132, illustrated as part of the aforedescribed the exemplary computing device 100. Additionally, the exemplary system 200 includes a hypervisor, such as the exemplary hypervisor 210, which can be comprised of computer executable instructions that are executed by the exemplary computing device 100 to enable the computing device 100 to perform the functionality associated with the exemplary hypervisor 210. As will be described in further detail below, the exemplary hypervisor 210 can include, or can reference, a Second Layer Address Table (SLAT), such as the exemplary SLAT 220.

The exemplary hypervisor 210 can virtualize a set of computing hardware that can either be commensurate with the hardware of the computing device 100, or which can differ therefrom, including differences in processor type and/or capacity, differences in quantity and/or type of RAM, differences in quantity and/or type of storage media, and other like differences. Such virtualization can, among other things, enable one or more virtual machine processes, such as the exemplary virtual machine processes 260 and 250. The hypervisor 210 can present, both to processes executing within the context of those virtual machines, and to any other process executing on top of the hypervisor, the appearance of executing directly on the computing device hardware 110. The exemplary system 200 shown in FIG. 2 illustrates an operating system, such as the exemplary operating system 240 executing on top of the exemplary hypervisor 210. In turn, as illustrated by the exemplary system 200, the exemplary operating system 240 can have executing thereon one or more computer executable application programs, such as the aforementioned virtual machine processes 260 and 250.

The exemplary operating system 240 can comprise various components, subcomponents, or aspects thereof that are relevant to the descriptions below. While illustrated as visually distinct elements in FIG. 2, such a visual depiction is not meant to convey a specific computational independence, such as process boundaries, independent memory silos, or other like computational delineations. One aspect of the operating system 240 can be a memory manager, such as the exemplary memory manager 241. More specifically, the exemplary memory manager 241 can read code or data from one or more computer readable storage media and copy such code or data into memory, which can be supported by the RAM 132.

As utilized herein, the term "virtual memory" is not made with reference to a virtual machine, but rather to the concept of presenting to application programs, or other processes executing on a computing device, the appearance of having access to a greater quantity of memory than is physically present in the RAM 132. Thus, for example, virtual memory functionality provided by the operating system 240 can allow the loading of code and/or data into memory that is, ultimately, supported by physical memory, such as the physical memory 132, but whose quantity is larger than the physical memory. The memory manager 241, executing as part of the operating system 240 can maintain, modify, and/or utilize the page table 250 to account for the correlation between one or more virtual memory addresses and one or more physical memory addresses. More specifically, the page table 250 provides address translation between one memory addressing scheme and another, different memory addressing scheme. To accomplish this, the page table 250 can comprise multiple hierarchical levels of tables, described in further detail below, that can correlate one or more memory addresses according to one memory addressing scheme, namely virtual memory addresses, to one or more memory addresses according to another, different memory addressing scheme, namely physical memory addresses.

The exemplary system 200 shown in FIG. 2 illustrates application programs executing on top of the operating system 240. In particular, such application programs can be virtual machine application programs that can instantiate virtual machine processes, such as the exemplary virtual machine processes 260 and 270. Each virtual machine process can create a virtual computing environment that can host its own operating system, application programs, and other like functionality that could be hosted by a physical computing environment, such as that presented by the computing device 100. Within the exemplary system 200 shown in FIG. 2, the exemplary virtual machine process 260 is illustrated as creating a virtual machine environment 261, and the exemplary virtual machine process 270 is illustrated as creating a virtual machine environment 271. The exemplary virtual machine environment 271 is illustrated as hosting an operating system, in the form of the exemplary operating system 281, which can be analogous to the exemplary operating system 240, or can be a different type of operating system. For purposes of illustration, the exemplary operating system 281, executing within the exemplary virtual machine environment 271, is illustrated as comprising a memory manager, namely the exemplary memory manager 282, which, in turn, references a page table, namely the exemplary page table 283, to provide for virtual memory within the virtual machine environment 271. Such virtual memory within the virtual machine environment 271 can be utilized by processes executing on top of the exemplary operating system 281, such as the exemplary processes 291 and 292, which are illustrated in FIG. 2 as also executing within the exemplary virtual machine environment 271.

In a manner similar to that implemented by the memory managers 241 and 282, the hypervisor 210, in facilitating the presentation of a virtual set of computing hardware, including memory, can similarly translate memory addresses from one memory addressing scheme to another, different memory addressing scheme. More specifically, the hypervisor 210 can translate memory addresses that were presented by the hypervisor 210 as being physical memory addresses into actual physical memory addresses, such as, for example, memory addresses that identify physical locations within the memory 132. Such a translation can be performed with reference to another hierarchically organized table, namely the SLAT 220, which can also provide for memory address translation between one memory addressing scheme, in this case addresses that are perceived by processes executing on top of the hypervisor 210 as being physical memory addresses, and another, different memory addressing scheme, namely, in this case, actual physical memory addresses.

According to one aspect, virtual memory provided by the operating system 240 can be utilized to back a virtual machine's physical memory rather than using non-paged physical memory allocations on the host computing device. This allows the memory manager 241 to manage the host physical memory associated with the guest physical memory. In particular, memory management logic that already exists on the host, such as the memory manager 241, can now be leveraged to manage the guest virtual machines' physical memory. This can allow for the use of a smaller hypervisor, in terms of the amount of code used to implement the hypervisor, such as the exemplary hypervisor 210. A smaller hypervisor can be more secure as there is less code that can be exploited or that may have errors. Further, this allows for increased virtual machine density on the host since less host physical memory can be utilized to implement virtual machines. For example, previously, because a virtual machine process required non-paged memory, if the exemplary computing device 100 comprised 3 GB of the RAM 132, then it could only host one virtual machine process that created a virtual machine having 2 GB of RAM. By contrast, if the memory consumed by a virtual machine process, such as the exemplary virtual machine process 270, was virtual memory, such as that provided by the memory manager 241 of the operating system 240, then a 4 GB virtual memory space could provide support for two virtual machine processes, each creating a virtual machine having 2 GB of RAM. In such a manner, the exemplary computing device 100 could host two virtual machine process, instead of just one, thereby increasing the density of virtual machine processes executing on the exemplary computing device 100.

Other benefits include a single memory management code base managing all of the memory on the system (host and virtual machine). Thus, improvements, fixes and/or tuning in one code base benefits everyone. Further, this can result in a reduction in engineering cost due to only having to maintain one code base. Another example benefit may be that virtual machines can immediately benefit from density improvements such as paging, page sharing, working set aging and trimming, fault clustering, etc. Another example benefit may be that virtual memory and physical memory consumption limits can be set on virtual machines just like any other process, allowing administrators ability to control the system behavior. Another example benefit may be that additional features can be added to the host memory manager to provide more performance, density and functionality for virtual machines (and other non-virtual machine workloads will likely benefit from these as well).

Figure 3:
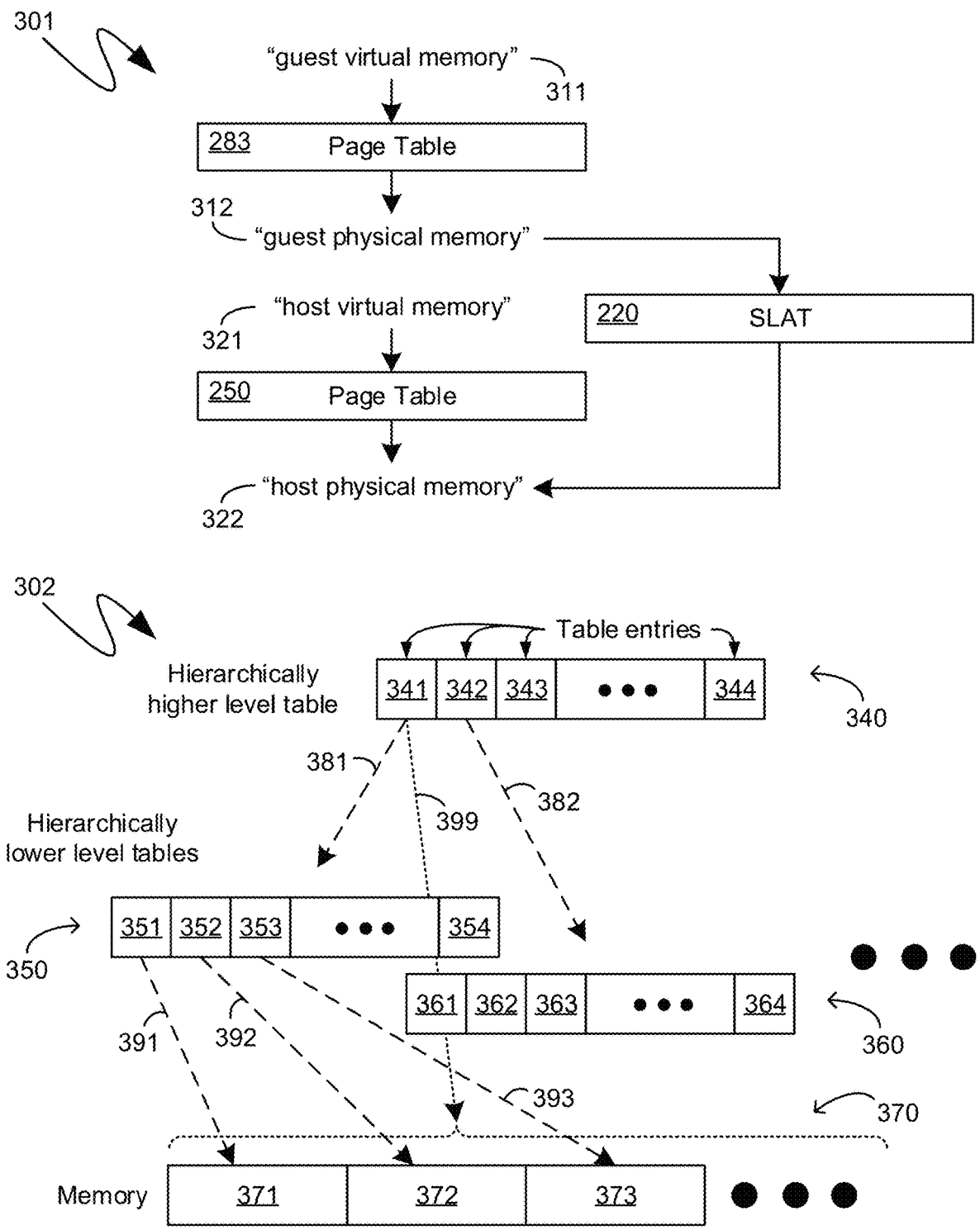
FIG. 3 is a block diagram illustrating terminology utilized herein.

Turning to FIG. 3, the system 300 illustrates the terminology utilized herein to refer to the multiple levels of page tables and corresponding memory addressing schemes that are applicable to the system 200 shown in FIG. 2. More specifically, within the virtual machine environment 271, the exemplary memory manager 282 can reference the page table 283 to correlate virtual memory addresses, within the context of the virtual machine environment 271, to physical memory addresses, again, within the context of the virtual machine environment 271. As indicated previously, the term "virtual memory" does not refer to memory within a virtual machine environment, but rather to an amount of memory made available to processes executing on a computing device that is supported by, but is larger than, the capacity of physical memory. Thus, to nominatively distinguish between virtual memory within a virtual machine environment and virtual memory within a non-virtualized, or "bare metal", computing environment, the adjectives "guest" and "host" will be utilized, with the adjective "guest" being indicative of a virtual machine computing environment, and the adjective "host" being indicative of a bare metal computing environment upon which executes a virtual machine process that provides the virtual machine environment.

As such, and as illustrated in system 301, addresses within the "guest virtual memory" 311 addressing scheme can be correlated to addresses within the "guest physical memory" 312 addressing scheme by the page table 283 within the virtual machine environment 271 that was shown in FIG. 2. Similarly, addresses within the "host virtual memory" 321 addressing scheme can be correlated to addresses within the "host physical memory" 322 addressing scheme by the page table 250 that is part of the exemplary operating system 240 that was shown in FIG. 2 as executing in a non-virtual computing environment. Although not illustrated by the exemplary system 301 in FIG. 3, according to one aspect, and as will be detailed further below, the guest physical memory 312 of a virtual machine environment can be backed by the host virtual memory 321, thereby providing the aforementioned benefits. Such a backing of the guest physical memory 312 with the host virtual memory 321 can entail modification of the SLAT 220, which provides for translation between the "guest physical memory" 312 addressing scheme and the "host physical memory" 322 addressing scheme, as illustrated by the exemplary system 301.

Turning to the system 302, also shown in FIG. 3, a hierarchical arrangement of tables is illustrated, such as can be utilized to implement the exemplary page table 250, the exemplary page table 283, and/or the exemplary SLAT 220. To accommodate quantities of memory applicable to modern computing devices and application program processes, the page tables 250, 283 and/or the SLAT 220 will have multiple, typically four, levels of hierarchical tables. However, for ease of illustration the system 302 illustrates only two levels of hierarchical tables. A hierarchically higher-level table 340 can comprise multiple table entries, such as the exemplary table entries 341, 342, 343 and 344. For example, the hierarchically higher-level table 340 can be 4 KB in size, and can comprise 512 discrete table entries, which can each be eight bytes in size. Each table entry can comprise a pointer, or other like identifier, of a hierarchically lower-level table, such as one of the exemplary hierarchically lower-level tables 350 and 360. Thus, for example, the exemplary table entry 341 can comprise an identification of the exemplary hierarchically lower-level table 350, as illustrated by the arrow 371. If the hierarchically higher-level table 340 was 4 KB in size, and each table entry was eight bytes in size, at least some of those eight bytes of data can be a pointer or other like identifier of the hierarchically lower-level table 350. The exemplary table entry 342 can, in a similar manner, comprise an identification of the hierarchically lower-level table 360, as illustrated by the arrow 372. Each of the remaining discrete table entries of the exemplary hierarchically higher-level table 340 can, similarly, identify unique hierarchically lower-level tables. Thus, in the example where the hierarchically higher-level table 340 was 4 KB in size, and comprised 512 table entries, each of eight bytes in size, such a hierarchically higher-level table 340 can comprise 512 identifications of 512 unique hierarchical lower-level tables, such as the exemplary hierarchically lower-level tables 350 and 360.

Each of the hierarchically lower-level tables can, in an analogous manner, comprise individual table entries. For example, the exemplary hierarchically lower-level table 350 can comprise the exemplary table entries 251, 352, 353 and 354. Similarly, the exemplary hierarchically lower-level table 360 can comprise table entries 361, 362, 363 and 364.

As one example, each of the hierarchically lower-level tables can be an equivalent size and structure to the hierarchically higher-level table 340. Thus, the exemplary hierarchically lower-level table 350 can be 4 KB in size, and can comprise 512 table entries, such as the exemplary table entries 351, 352, 353 and 354, which can each be eight bytes in size. In the example illustrated by the system 302, the cable entries of the hierarchically lower-level tables, such as, for example, the exemplary table entries 351, 352, 353 and 354 of the exemplary hierarchically lower-level table 350 can each identify a contiguous range of memory addresses. For example, the exemplary table entry 351 can identify the range of memory addresses 371, as illustrated by the arrow 391. The range of memory addresses 371 can comprise a "page" of memory and can be the smallest individually manageable quantity of memory. Thus, actions such a moving information stored in volatile memory temporarily to non-volatile storage media, or vice-versa, as part of enabling an amount of virtual memory that is greater than the amount of physical memory installed, can be performed on a page-by-page basis. Additionally, access permissions can be established on a page-by-page basis. For example, because the range of memory 371 is singly identified by the table entry 351, the access permissions can apply to all of the memory addresses within the range of memory 371. Conversely, the access permissions of the memory addresses within the range of memory 371 can be independent of the access permissions established for the range of memory 372, which can be uniquely identified by a different table entry, namely the table entry 352, as illustrated by the arrow 392.

The quantity of memory in a single memory page, such as the range of memory 371, can be dependent on various factors, including processor design and other hardware factors, as well as communicational connections and the like. In one example, a page of memory, such as that represented by the range of memory 371, can be 4 KB in size.

Upon receiving a request to access memory locations identified by one or more memory addresses, a table entry in a hierarchically higher-level table can be identified that corresponds to a range of memory addresses that includes the memory addresses that are to be accessed. For example, if the memory addresses to be accessed included the memory represented by the memory 371, the table entry 341 can be identified in the hierarchically higher-level table 340. Identification of the table entry 341 can, in turn, resulted in the identification of the hierarchically lower-level table 350. Within the hierarchically lower-level table 350 the memory addresses to be accessed can be determined to be part of the memory that is identified by the table entry 351. Information within the table entry 351 can then identify the memory 371 sought to be accessed.

Each such traversal of a hierarchically lower-level of the page table can increase the delay between receiving a request to access memory and returning access to that memory. According to one aspect, a table entry of a hierarchically higher-level table, such as, for example, the exemplary table entry 341 of the hierarchically higher-level table 340, can identify not a hierarchically lower-level table, such as the exemplary hierarchically lower-level table 350, but rather a page of memory that can correspond to the entire range of memory that would have been identified by the table entries in a hierarchically lower-level table. Thus, for example, if each page of memory 371, 372 and 373 identified by the individual table entries 351, 352 and 353 of the hierarchically lower-level table 350 was 4 KB in size, then a range of memory of 2 MB in size can be identified by the combined quantity of all of the individual table entries of hierarchically lower-level table 350, since the exemplary hierarchically lower-level table 350 can comprise 512 table entries, each identifying a range of memory 4 KB in size. In such an example, if all 2 MB of memory were treated as a single 2 MB memory page, such a single, large memory page could be identified directly by the exemplary table entry 341 of the hierarchically higher-level table 340. In such an instance, because the exemplary table entry 341 would directly identify a single 2 MB memory page, such as the exemplary 2 MB memory page 370, and would not identify a hierarchically lower-level table, there would be no need to reference any hierarchically lower-level table. For example, if a page table or SLAT comprised four hierarchical levels, utilizing a large memory page, such as the exemplary large memory page 370, would enable one of those hierarchical levels of tables to be skipped, and not referenced, thereby providing memory address translation between virtual and physical memory by referencing only three hierarchical levels of tables, instead of four, providing memory access more efficiently, namely 25% more efficiently. Because a page is the smallest amount of individually manageable memory, if a 2 MB sized memory page is used, then memory access permissions, for example, can be the same for all 2 MB of memory in such a large memory page.

As a further example, if there was a hierarchically arranged table that was hierarchically above the exemplary table 340, and each entry in the exemplary table 340, such as the entries 341, 342, 343 and 344 could address a 2 MB memory page, such as the exemplary 2 MB memory page 370, then the 512 individuals such table entries could, when aggregated together, address 1 GB of memory. If a single 1 GB page of memory was used, both the reference to the table 340, and a subsequent reference to a hierarchically lower-level table, such as the exemplary table 350, could both be avoided. Returning to the example where a page table or SLAT comprises four hierarchical levels, utilizing such a huge memory page would enable two of those hierarchical levels of tables to be skipped, and not referenced, thereby providing memory address translation between virtual and physical memory by referencing only to hierarchical levels of tables, instead of four, providing memory access in approximately half the time. Again, because a page is the smallest amount of individually manageable memory, if a 1 GB sized memory page is used, then memory access permissions, for example, can be the same for all 1 GB of memory in such a huge memory page.

The term "large memory page", as utilized herein, means a contiguous range of memory that is sized such that it encompasses all of the ranges of memory that would have been identified by a single table at the hierarchically lowest-level and can be uniquely and directly identified by a single table entry of a table at one hierarchical level above the hierarchically lowest-level table. In the specific sizing example provided above, a "large memory page", as that term is defined herein, would be a memory page of 2 MB in size. However, as indicated, the term "large memory page" does not refer to a specific size, but rather the quantity of memory in a "large memory page" is dependent on the hierarchical design of the page table itself and the quantity of memory referenced by each table entry at the hierarchically lowest-level of the page table.

In a similar manner, the term "huge memory page", as utilized herein, means a contiguous range of memory that is sized such that it encompasses all of the ranges of memory that would have been identified by a single table at a hierarchically second-lowest-level and can be uniquely and directly identified by a single table entry of a table at one hierarchical level above the hierarchically second-lowest-level table. In the specific sizing example provided above, a "huge memory page", as that term is utilized herein, would be a memory page of 1 GB in size. Again, as indicated, the term "huge memory page" does not refer to a specific size, but rather the quantity of memory in a "huge memory page" is dependent on the hierarchical design of the page table itself and the quantity of memory referenced by each table entry at the hierarchically lowest-level of the page table.

Turning back to FIG. 2, descriptions of mechanisms by which host virtual memory (of a host computing device) can be utilized to back the guest physical memory (of a virtual machine) are provided with reference to a virtualization stack, such as the exemplary virtualization stack 230 shown in FIG. 2. A user-mode process can be executed on the host computing device to provide virtual memory for backing guest virtual machines. One such user-mode process can be created for each guest machine. Alternatively, a single user-mode process could be used for multiple virtual machines, or multiple processes may be used for a single virtual machine. Alternatively, virtual memory could be implemented in other fashions than using a user-mode process as will be illustrated below. For purposes of illustration, virtual memory assigned to the virtual machine process 270 can be utilized to back the guest physical memory presented by the virtual machine process 270 in the virtual machine environment 271 and, similarly, virtual memory assigned to the virtual machine process 260 can be utilized to back the guest physical memory presented by the virtual machine process 260 in the virtual machine environment 261. Although illustrated as such in the exemplary system 200 of FIG. 2, the aforementioned user-mode process can be separate from virtual machine processes, such as exemplary virtual machine processes 260 and 270.

According to one aspect, a virtualization stack, such as the exemplary virtualization stack 230, can allocate host virtual memory in the address space of a designated user-mode process that will host the virtual machine, such as the exemplary virtual machine process 260 or 270. The host memory manager 241 can treat this memory as any other virtual allocation, which means that it can be paged, the physical page backing it can be changed for the purposes of satisfying contiguous memory allocations elsewhere on the system, the physical pages can be shared with another virtual allocation in another process (which in-turn can be another virtual machine backing allocation or any other allocation on the system). At the same time, many optimizations are possible to make the host memory manager treat the virtual machine backing virtual allocations specially as necessary. Also, if the virtualization stack 230 chooses to prioritize performance over density, it can perform many operations supported by the operating system memory manager 241 such as locking the pages in memory to ensure that the virtual machine will not experience paging for those portions. Similarly, large pages can be used to provide even more performance for the virtual machine, as will be detailed below.

A given virtual machine can have all of its guest physical memory addresses in guest physical memory backed by host virtual memory or can have some of its guest physical memory addresses in guest physical memory backed by host virtual memory and some by legacy mechanisms such as non-paged physical memory allocations made from the host physical memory.

When a new virtual machine is created, the virtualization stack 230 can use a user-mode process to host the virtual machine allocation to back the guest physical memory. This can be a newly created empty process, an existing process hosting multiple virtual machines, or a process per virtual machine that also contains other virtual machine-related virtual allocations that are not visible to the virtual machine itself (e.g. virtualization stack data structures). It's also possible to use kernel virtual address space to back the virtual machine. Once such a process is found or created, the virtualization stack 230 can make a private memory virtual allocation (or a section/file mapping) in its address space that corresponds to the amount of guest physical memory the virtual machine should have. Specifically, the virtual memory can be a private allocation, a file mapping, a pagefile-backed section mapping or any other type of allocation supported by the host memory manager 241. This does not have to be one contiguous allocation, although, as will be detailed below, such an allocation can provide access speed advantages. Such an allocation can, instead, be an arbitrary number of allocations.

Once the virtual memory allocations have been made, they can be registered with the components that will manage the physical address space of the virtual machine, such as the exemplary virtual machine environment 271, and keep it in sync with the host physical memory pages that the host memory manager 241 will choose to back the virtual memory allocations. These components can be the hypervisor 210 and the virtualization stack 230, which can be implemented as part of the host kernel and/or a driver. The hypervisor 210 can manage the translation between guest physical memory address ranges and corresponding host physical memory address ranges by utilizing the SLAT 220. In particular, the virtualization stack 230 can update the SLAT 220 with the host physical memory pages that are backing the corresponding guest physical memory pages. The hypervisor 210 can expose the ability for the virtualization stack 230 to receive intercepts when a certain access type is performed by a guest virtual machine, such as the exemplary virtual machine 271, to a given guest physical memory address. For example, the virtualization stack 230 can request to receive an intercept when a certain physical address is written by the guest virtual machine 271.

According to one aspect, when a virtual machine, such as the exemplary virtual machine 271, is first created, the SLAT 220 may not contain any valid entries corresponding to such a virtual machine because no host physical memory addresses may have been allocated to back the guest physical memory addresses of such a virtual machine (although as illustrated below, in some embodiments, the SLAT 220 can be prepopulated for some guest physical memory addresses at or around the same time as the creation of the virtual machine 271). The hypervisor 210 can be aware of the guest physical memory address ranges that will be utilized by the virtual machine 27, but none of them need be backed by any host physical memory at this point. When the virtual machine process 270 begins execution, it can begin to access its (guest) physical memory pages. As each new physical memory address is accessed, it can generate an intercept of the appropriate type (read/write/execute) since the corresponding SLAT entry is not populated with corresponding host physical memory addresses yet. The hypervisor 210 can receive the guest access intercept and can forward it to the virtualization stack 230. In turn, the virtualization stack 230 can refer to a data structure maintained by the virtualization stack 230 to find the host virtual memory address range that corresponds to the requested guest physical memory address range (and the host process whose virtual address space the backing was allocated from, such as the exemplary virtual machine process 270). At that point, the virtualization stack 230 can know the specific host virtual memory address that corresponds to the guest physical memory address that generated the intercept.

The virtualization stack 230 can then issue a virtual fault to the host memory manager 241 in the context of the process hosting the virtual address range, such as the virtual machine process 270. The virtual fault can be issued with the corresponding access type (read/write/execute) of the original intercept that occurred when the virtual machine 271 accessed its physical address in guest physical memory. A virtual fault can execute an analogous, or identical, code path as a regular page fault would take to make the specified virtual address valid and accessible by the host CPU. One difference can be that a virtual fault code path can return the physical page number that the memory manager 241 used to make the virtual address valid. This physical page number can the host physical memory address that is backing the host virtual address, which is, in turn, backing the guest physical memory address that originally generated the access intercept in the hypervisor 210. At this point, the virtualization stack 230 can generate or update a table entry in the SLAT 220 corresponding to the original guest physical memory address that generated the intercept with the host physical memory address and the access type (read/write/execute) that was used to make the virtual address valid in the host. Once this is done, the guest physical memory address can be immediately accessible with that access type to the guest virtual machine 271. For example, a parallel virtual processor in the guest virtual machine 271 can immediately access such an address without hitting an intercept. The original intercept handling can be complete and the original virtual processor that generated the intercept can retry its instruction and proceed to access the memory now that the SLAT contains a table entry that can correlate the guest physical address requested with a corresponding host physical memory address.

If and/or when the host memory manager 241 decides to perform any action that could or would change the host physical address backing of the host virtual address that was made valid via a virtual fault, it can perform a translation buffer (TLB) flush for that host virtual address. It can already perform such an action to conform with an existing contract the host memory manager 241 can have with hardware CPUs on the host. The virtualization stack 230 can intercept such TLB flushes and invalidate the corresponding SLAT entries of any host virtual addresses that are flushed that are backing any guest physical memory addresses in any virtual machines. The TLB flush call can identify a range of virtual addresses being flushed. The virtualization stack 230 can then look up the host virtual addresses being flushed against its data structures, which can be indexed by host virtual address to find guest physical ranges that may be backed by the given host virtual address. If any such ranges are found, the SLAT entries corresponding to those guest physical memory addresses can be invalidated. Additionally, the host memory manager can treat virtual allocations that back virtual memory differently if necessary or desired to optimize TLB flush behavior (e.g. to reduce SLAT invalidation time, subsequent memory intercepts, etc.)

The virtualization stack 230 can carefully synchronize the updating of the SLAT 220 with the host physical memory page number returned from the virtual fault (that is serviced by the memory manager 241) against TLB flushes performed by the host (which are issued by the memory manager 241). This can be done to avoid adding complex synchronization between the host memory manager 241 and the virtualization stack 230. The physical page number returned by the virtual fault may be stale by the time it is returned to the virtualization stack 230. For example, the virtual addresses may have already been invalidated. By intercepting the TLB flush calls from the host memory manager 241, the virtualization stack 230 can know when this race occurred and retry the virtual fault to acquire the updated physical page number.

When the virtualization stack 230 invalidates a SLAT entry, any subsequent access to that guest physical memory address by the virtual machine 271 will again generate an intercept to the hypervisor 210, which will in-turn be forwarded to the virtualization stack 230 to be resolved as described above. The same process can repeat when a guest physical memory address is accessed for read first and then is written to later. The write will generate a separate intercept because the SLAT entry can have only been made valid with a "read" access type. That intercept can be forwarded to the virtualization stack 230 as usual and a virtual fault with "write" access can be issued to the host memory manager 241 for the appropriate virtual address. The host memory manager 241 can update its internal state (typically in the page table entry (or "PTE")) to indicate that the host physical memory page is now dirty. This can be done before allowing the virtual machine to write to its guest physical memory address, thereby avoiding data loss and/or corruption. If and/or when the host memory manager 241 decides to trim that virtual address (which will perform a TLB flush and invalidate the corresponding SLAT entry as a result), the host memory manager 241 can know that the page is dirty and needs to be written to a non-volatile computer readable storage medium, such as a pagefile on a hard disk drive, before being repurposed. In such a manner, the above described sequence is not dissimilar from what would happen for a regular private virtual allocation for any other process running on the host computing device 100.

As one optimization, the host memory manager 241 can choose to perform a page combing pass over all of its memory 120. This can be an operation where the host memory manager 241 finds identical pages across all processes and combines them into one read-only copy of the page that all processes share. If and/or when any of the combined virtual addresses are written to, the memory manager 241 can perform a copy-on-write operation to allow the write to proceed. Such an optimization can now work transparently across virtual machines, such as the exemplary virtual machines 261 and 271, to increase the density of virtual machines being executed on a given computing device by combining identical pages across virtual machines, and, thereby, reducing memory consumption. When page combining occurs, the host memory manager 241 can update PTEs that map the virtual addresses being affected. During this update, it can perform a TLB flush because the host physical memory address can change for those virtual addresses from a unique private page to the shared page. As part of this, as described above, the virtualization stack 230 can invalidate the corresponding SLAT entries. If and/or when the guest physical memory addresses, whose virtual addresses were combined to point to the shared page, are read, the virtual fault resolution can return the physical page number of the shared page during intercept handling and the SLAT 220 can be updated to point to the shared page.

If any of the combined guest physical memory addresses are written to by the virtual machine, the virtual fault with write access can perform a copy-on-write operation and a new private host physical memory page number can be returned and updated in the SLAT 220. For example, the virtualization stack 230 can direct the host memory manager 241 to perform a page combining pass. In some embodiments, it is possible for the virtualization stack 230 to specify which portion of memory is to be scanned for combing or which processes should be scanned. For example, the virtualization stack 230 can identify the processes, such as the exemplary virtual machine processes 260 and 270, whose host virtual memory allocations are backing the guest physical memory of the corresponding virtual machines, namely the exemplary virtual machines 261 and 271, as being the processes that are to be scanned for combining.

Even when the SLAT 220 is updated to allow write access due to a virtual fault being performed for write, the hypervisor 210 can support triggering intercepts on writes to such SLAT entries if requested by the virtualization stack 230. This can be useful because the virtualization stack 230 may want to know when writes occur regardless of the fact that it is acceptable to the host memory manager 241 for these writes to occur. For example, live migration of virtual machines or virtual machine snapshotting can entail the virtualization stack 230 monitoring writes. The virtualization stack 230 can still be notified when writes occur even if the host memory manager's state has already been updated accordingly for writes, such as, for example, if the PTE has been already marked as dirty.

The host memory manager 241 can be able to maintain accurate access history for each host virtual page backing the guest physical memory address space just like it does for regular host virtual pages allocated in any other process address space. For example, an "accessed bit" in a PTE can be updated during virtual faults performed as part of handling memory intercepts. When the host memory manager clears the accessed bit on any PTE, it can already flush the TLB to avoid memory corruption. As described before, this TLB flush can invalidate the corresponding SLAT entry, which can, in turn, generate an access intercept if the virtual machine accesses its guest physical memory address again. As part of handling the intercept, the virtual fault processing in the host memory manager 241 can set the accessed bit again, thus maintaining proper access history for the page. Alternatively, for performance reasons, such as to avoid access intercepts in the hypervisor 210 as much as possible, the host memory manager 241 can consume page access information directly from the hypervisor 210 as gathered from the SLAT entries if supported by the underlying hardware. The host memory manager 241 could cooperate with the virtualization stack 230 to translate access information in the SLAT 220 (which is organized by guest physical memory addresses) to the host virtual memory addresses backing those guest physical memory addresses to know which addresses were accessed.

By having accurate access history for the pages, the host memory manager 241 can run its usual intelligent aging and trimming algorithms of process' working sets. This can allow the host memory manager 241 to examine the state of the whole system and make intelligent choices about which addresses to trim and/or page out to disk, or other like operations, to alleviate memory pressure if necessary or for other reasons.

In some embodiments, virtual and physical memory limits can be imposed on virtual machines by the host memory manager 241 just like any other process on the system. This can aid the system administrator sandbox, or otherwise constrain or enable, virtual machines, such as the exemplary virtual machines 261 and 271. The host system can use the same mechanisms to accomplish this as it would for native processes. For example, in some embodiments where higher performance is desired, a virtual machine can have the entirety of its guest physical memory backed directly by host physical memory. Alternatively, portions may be backed by host virtual memory while other portions are backed by host physical memory 120. As yet another example, where lower performance can be acceptable, a virtual machine can be backed primarily by host virtual memory, and the host virtual memory can be limited to less than full backing by host physical memory. For example, a virtual machine, such as the exemplary virtual machine 271, can present a guest physical memory of 4 GB in size, which, in turn, utilizing the above-described processes, may be backed by 4 GB of host virtual memory. However, the host virtual memory may be constrained to be backed by only 2 GB of host physical memory. This may cause paging to disk or other performance hindrances, but may be a way for administrators to throttle based on service levels or exert other control on virtual machine deployment. Similarly, a certain amount of physical memory may be guaranteed to a virtual machine (while still enabling the virtual machine to be backed by host virtual memory) as supported by the host memory manager to provide a certain consistent level of performance.

A quantity of guest physical memory presented by within the virtual machine environment can be dynamically changed. When guest physical memory needs to be added, another host virtual memory address range can be allocated as described earlier. Once the virtualization stack 230 is ready to handle access intercepts on the memory, the guest physical memory address range can be added to the virtual machine environment. When removing guest physical memory addresses, the portions of the host virtual address range backing the removed guest physical memory addresses can be freed by the host memory manager 241 (and updated accordingly in the virtualization stack 230 data structures). Alternatively, or in addition, various host memory manager APIs can be called on those portions of the host virtual address range to free the host physical memory pages without releasing the host virtual address space for it. Alternatively, in some embodiments, it is possible to do nothing at all since the host memory manager 241 can eventually trim these pages from the working set and eventually write them to the disk, such as a pagefile, because they will not be accessed any more in practice.

According to one aspect, the SLAT 220 can be prepopulated with some or all guest physical memory address to host physical memory address mappings. This could reduce the number of fault handling operations performed at virtual machine initialization. However, as the virtual machine operates, entries in the SLAT 220 can be invalidated for various reasons, and the fault handling described above can be used to once again correlate guest physical memory addresses to host physical memory addresses. The SLAT entries can be prepopulated prior to the booting of the virtual computing environment, or at runtime. Additionally, the entire SLAT 220 or only portions of it may be prepopulated.

Another optimization can be the pre-fetching, into the host physical memory additional portions of host virtual memory, backing the guest physical memory, that were previously paged out, such that, when a subsequent memory intercept arrives, the virtual fault can be satisfied more quickly, since it can be satisfied without having to go to disk to read the data.

Figure 4:
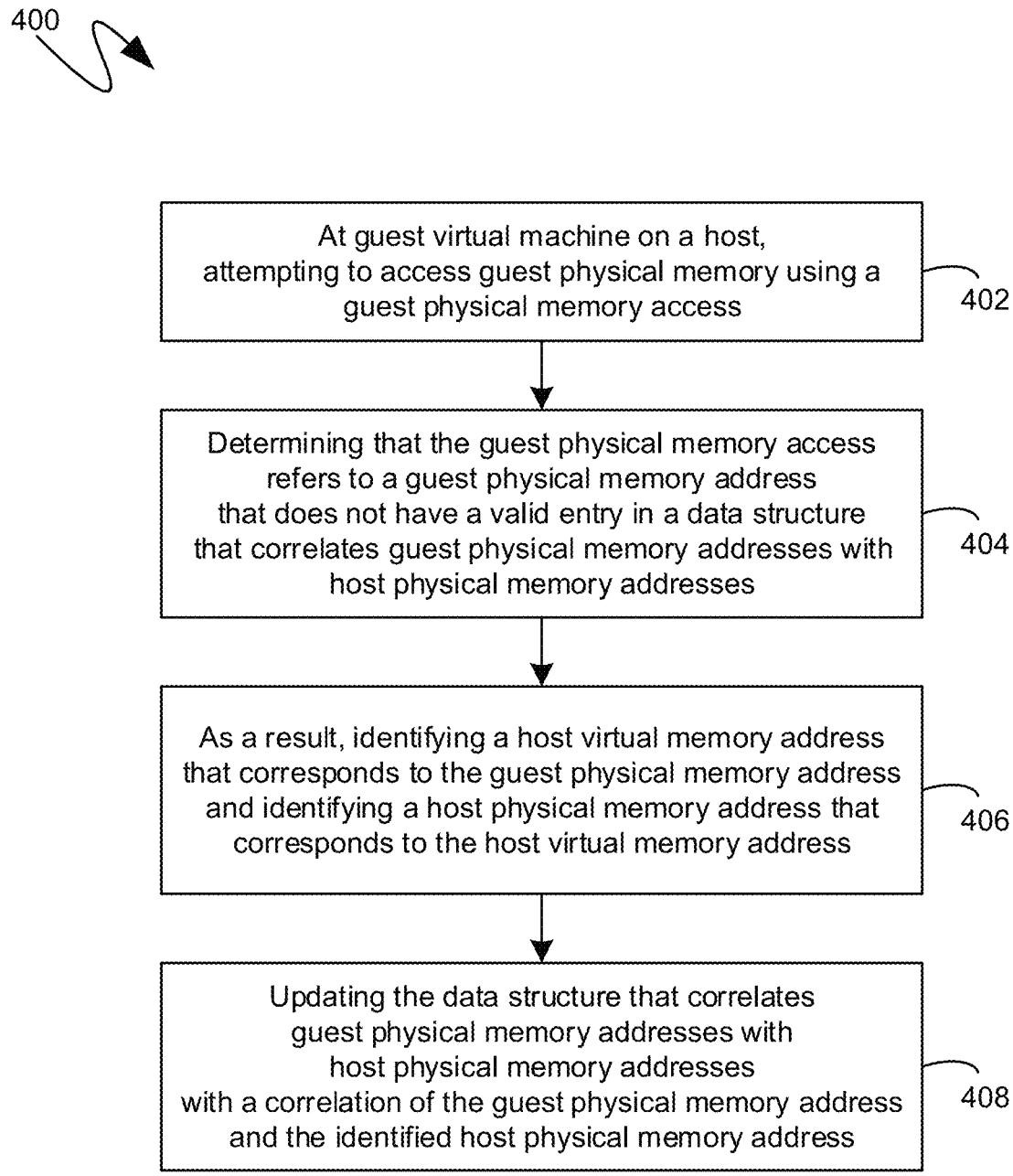
FIG. 4 is a flow diagram illustrating an exemplary method for backing guest physical memory with host virtual memory.

Turning to FIG. 4, a method 400 is illustrated providing an overview of the mechanisms described in detail above. The method 400 can include acts for backing guest physical memory with host virtual memory. The method includes, from a virtual machine on executing on a host computing device, attempting to access guest physical memory using a guest physical memory access (act 402). For example, the virtual machine environment 271, shown in FIG. 2, may access guest physical memory which, to processes executing within the virtual machine environment 271 appears as actual, physical memory.

The method 400 can further include determining that the guest physical memory access refers to a guest physical memory address that does not have a valid entry in a data structure that correlates guest physical memory addresses with host physical memory addresses (act 404). For example, a determination may be made that there is no valid entry in the SLAT 220, shown in FIG. 2.

As a result, the method 400 can include identifying a host virtual memory address that corresponds to the guest physical memory address and identifying a host physical memory address that corresponds to the host virtual memory address (act 406). For example, the virtualization stack 230, shown in FIG. 2, can identify a host virtual memory address that corresponds to the guest physical memory address and the memory manager 241, also shown in FIG. 2, can identify a host physical memory address that corresponds to the host virtual memory address.

The method 400 can further include updating the data structure that correlates guest physical memory addresses with host physical memory addresses with a correlation of the guest physical memory address and the identified host physical memory address (act 408). For example, the virtualization stack 230, shown in FIG. 2, can obtain the host physical memory address from the memory manager 241, also shown in FIG. 2, and update the SLAT 220 (shown in FIG. 2) with a correlation of the guest physical memory address and the identified host physical memory address.

The method 400 may be practiced by causing an intercept. The intercept can be forwarded to a virtualization stack on the host. This can cause the virtualization stack to identify the host virtual memory address that corresponds to the guest physical memory address and to issue a fault to a memory manager to obtain the host physical memory address that corresponds to the host virtual memory address. The virtualization stack can then update the data structure that correlates guest physical memory addresses with host physical memory addresses with a correlation of the guest physical memory address and the identified host physical memory address.

The method 400 may further include determining a type for the guest physical memory access and updating the data structure that correlates guest physical memory addresses with host physical memory addresses with the determined type correlated to the guest physical memory address and the identified host physical memory address. For example, if the guest physical memory access is a read, the SLAT could be updated to so indicate.

The method 400 may further include performing an action that may change a host physical memory address backing the host virtual memory address. As a result, the method may include invalidating an entry correlating the guest physical memory address with the host physical memory address in the data structure that correlates guest physical memory addresses with host physical memory addresses. This can cause subsequent access to the guest physical memory address to generate a fault which can be used to update the data structure that correlates guest physical memory addresses with host physical memory addresses with a correct correlation for host virtual memory backing the guest physical memory address. For example, the action may include a page combining operation. Page combining may be used to increase the density of virtual machines on a host.

The method 400 can include initializing the guest virtual machine. As part of initializing guest virtual machine, the method 400 may include prepopulating at least a portion of the data structure that correlates guest physical memory addresses with host physical memory addresses with some or all guest physical memory address to host physical memory address mappings for the guest virtual machine. Thus, for example, host physical memory could be pre-allocated for a virtual machine and appropriate correlations entered into the SLAT. This would result in fewer exceptions being needed to initialize the guest virtual machine.

Figure 5:
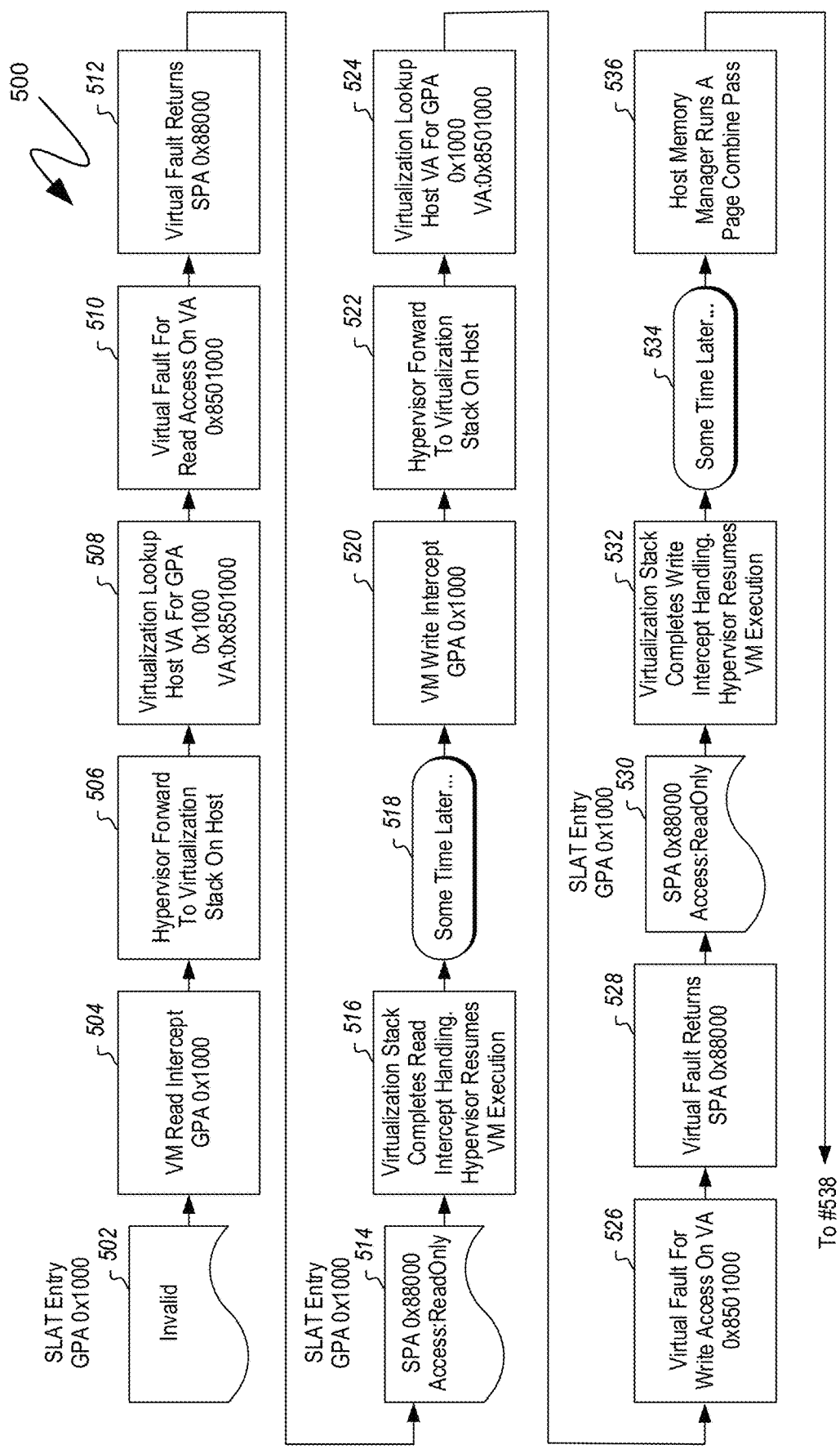
FIG. 5 is a flow diagram illustrating various exemplary actions in the lifecycle of data in guest physical memory that is backed by host virtual memory.
Figure 5:
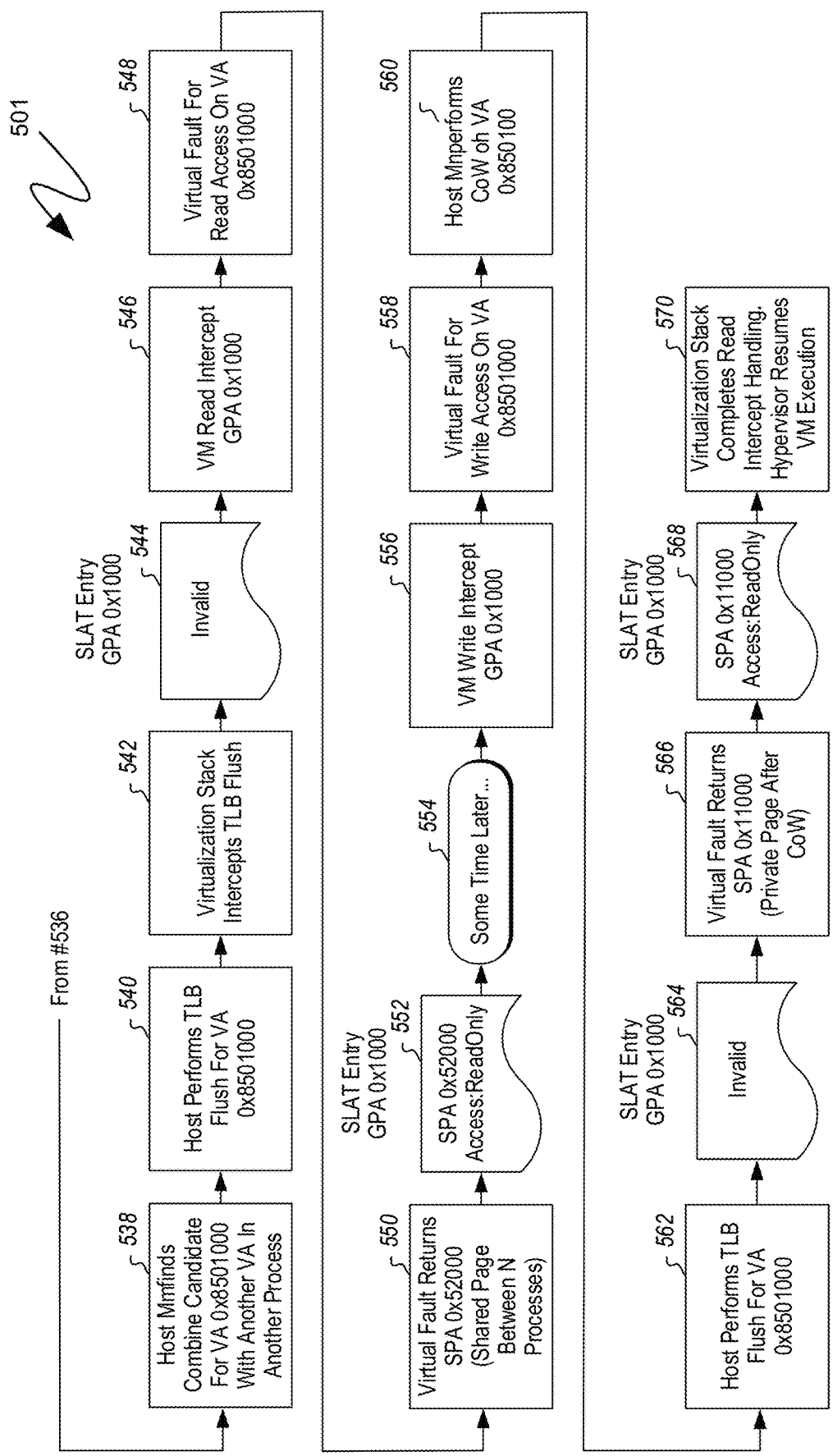

Referring now to FIG. 5, an example flow 500 is illustrated showing various actions that may occur over a portion of the lifetime of some data at an example guest physical memory address (hereinafter abbreviated "GPA") 0x1000. As illustrated at 502, a SLAT entry for GPA 0x1000 is invalid meaning that there is no SLAT entry for that particular GPA. As illustrated at 504 a virtual machine attempts to perform a read at GPA 0x1000 causing a virtual machine ((hereinafter abbreviated "VM") read intercept. As illustrated at 506, a hypervisor forwards the intercept to the virtualization stack on the host. At 508, the virtualization stack performs a virtualization lookup for a host virtual memory address (VA) corresponding to the GPA 0x1000. The look up yields VA 0x8501000. At 510, a virtual fault is generated for a read access on VA 0x8501000. The virtual fault handing from the memory manager returns a system physical address (hereinafter abbreviated "SPA") of 0x88000 defining an address in system memory where the data at GPA 0x1000 is physically located. Therefore, as illustrated at 514, the SLAT is updated to correlate GPA 0x1000 with SPA 0x88000 and to mark the data access as "Read Only". At 516, the virtualization stack completes read intercept handling and the hypervisor resumes guest virtual machine execution.

As illustrated at 518, time passes. At 520, the virtual machine attempts write access at GPA 0x1000. At 522, the hypervisor forwards the write access to the virtualization stack on the host. At 524, the virtualization stack performs a virtualization lookup for a host VA for GPA 0x1000. As noted previously, this is at VA 0x8501000. At 526 a virtual fault occurs for write access on VA 0x8501000. At 528, the virtual fault returns SPA 0388000 in the physical memory. At 530, the SLAT entry for GPA 0x1000 is updated to indicate that the data access is "Read/Write". At 532, the virtualization stack completes write intercept handling. The hypervisor resumes guest virtual machine execution.

As illustrated at 534, some time passes. At 536, the host memory manager runs a page combine pass to combine any pages in host physical memory that are functionally identical. At 538, the host memory manager finds combine candidates for VA 0x8501000 and another virtual address in another process. At 540, the host performs a TLB flush for VA 0x8501000. At 542, the virtualization stack intercepts the TLB flush. At 544, the SLAT entry for GPA 0x1000 is invalid. At 546, a virtual machine intercept is performed for GPA 0x1000. At 548, a virtual fault for read access on VA 0x8501000 occurs. At 550, the virtual fault return SPA 0x52000, which is the shared page between N processes from the page combine pass at 536. At 552, the SLAT entry for GPA 0x1000 is updated to correlate with SPA 0x52000, with access set to "Read Only".

As illustrated at 554, some time passes. At 556, a virtual machine write intercept occurs for GPA 0x1000. At 558 a virtual fault for write access on VA 0x8501000 occurs. At 560, the host memory manager performs a copy-on write on VA 0x8501000. At 562, the host performs a TLB flush for VA 0x850100. As illustrated at 564, this causes the SLAT entry for GPA 031000 to be invalidated. At 566, a virtual fault return SPA 0x11000, which is a private page after the copy-on write. At 568, the SLAT entry for GPA 0x1000 is updated to SPA 0x1000 with access set to "Read/Write". At 570 the virtualization stack completes read intercept handling and the hypervisor resumes virtual machine execution.

Thus, as illustrated above, virtual machine physical address space is backed by host virtual memory (typically allocated in a host process' user address space), which is subject to regular virtual memory management by the host memory manager. Virtual memory backing the virtual machine's physical memory can be of any type supported by the host memory manager 118 (private allocation, file mapping, pagefile-backed section mappings, large page allocation, etc.) A host memory manager can perform its existing operations and apply policies on the virtual memory and/or apply specialized policies knowing that the virtual memory is backing virtual machine's physical address space as necessary.

Figure 6:
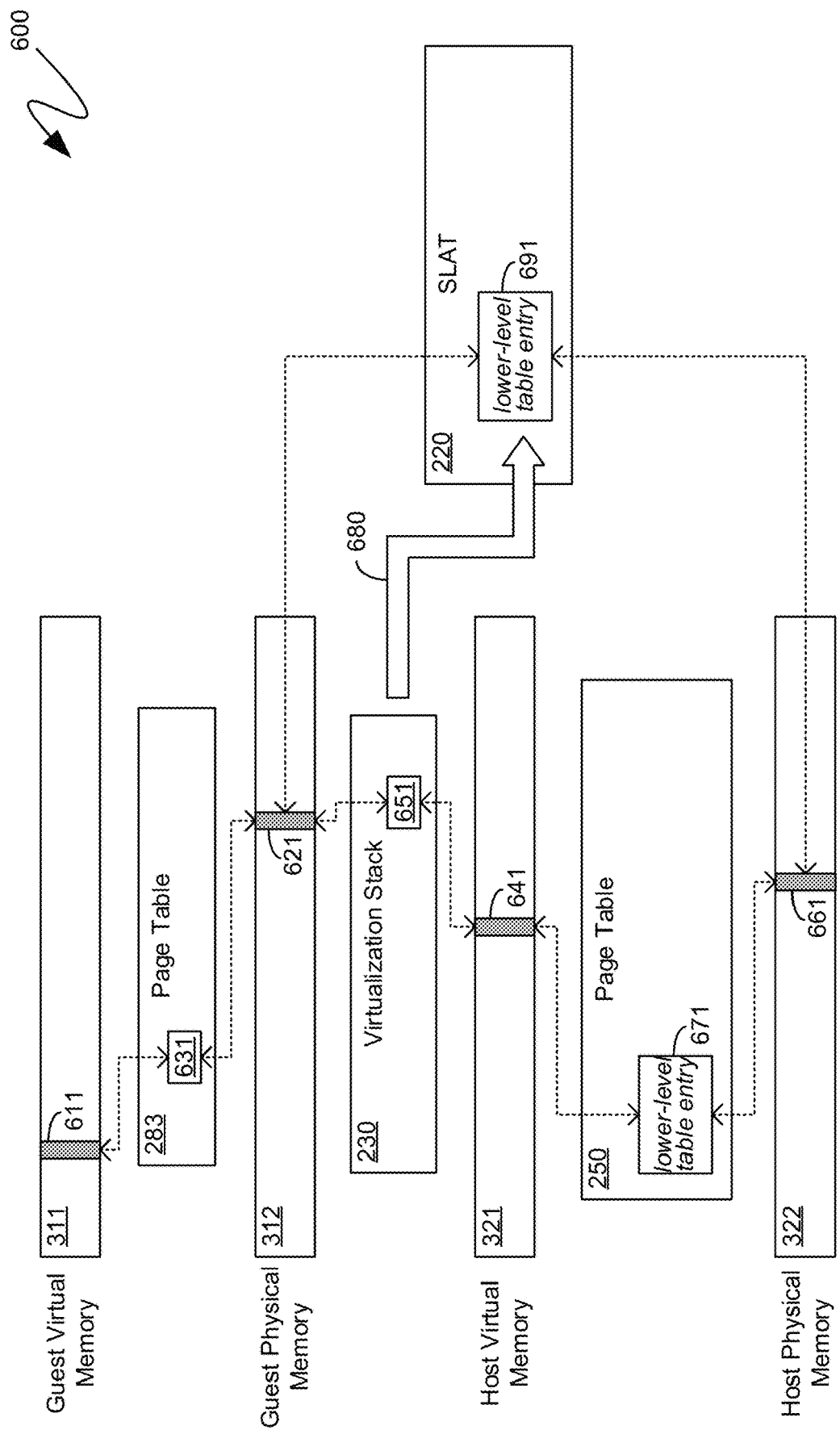
FIG. 6 is a block diagram illustrating an exemplary mechanism for backing guest physical memory with host virtual memory.

Turning to FIG. 6, the exemplary system 600 shown therein comprises a block representation of the mechanisms outlined in FIG. 4 and detailed in FIG. 5, as described above. More specifically, the guest virtual memory 311, guest physical memory 312, host virtual memory 321 and host physical memory 322 are illustrated as rectangular blocks whose width represents a range of memory. For simplicity of illustration, the rectangular blocks are of approximately equal width, even though, in practical operation, a quantity of virtual memory would likely exceed the quantity of physical memory backing such virtual memory.

As described in detail above, when a process executing within a virtual machine computing environment, such as the exemplary virtual machine computing environment 271, shown in FIG. 2, accesses a portion of the virtual memory presented by the operating system executing within such a virtual machine computing environment, a page table of that operating system, such as the exemplary page table 283, can comprise a PTE that can correlate the accessed virtual memory address to a physical memory address, at least as perceived by processes executing within the virtual machine computing environment. Thus, for example, if virtual memory represented by the region 611 is accessed, a PTE 631, that can be part of the page table 283, can correlate that region 611 of the guest virtual memory 311 to a region 621 of the guest physical memory 312. As further described in detail above, the guest physical memory 312 can be backed by a portion of the host virtual memory 321. Thus, the above described virtualization stack 230 can comprise a data structure that can include an entry 651 that can correlate the region 621 of the guest physical memory 312 to a region 641 of the host virtual memory 321. Processes executing on the host computing device, including the aforedescribed page table 250, can then correlate the region 641 of the host virtual memory 321 to a region 661 of the host physical memory 322. As also described in detail above, the SLAT 220 can comprise a hierarchically arranged set of tables that can be updated with a table entry 691 that can correlate the region 621, of the guest physical memory 312, to the region 661 of the host physical memory 322. More specifically, mechanisms, such as those implemented by the virtualization stack 230, can detect the correlation between the region 621 and the region 661 and can update, or generate, a table entry, such as the entry 691, within the SLAT 220, as illustrated by the action 680, to include such a correlation. In such a manner, the guest physical memory 312 can be backed by host virtual memory 321, while continuing to allow existing mechanisms, including the SLAT 220, to function in their traditional manner. For example, a subsequent access of the region 611 of the guest virtual memory 311, of a process executing within that virtual machine computing environment, can entail two page table lookups in a traditional manner: (1) the page table lookup performed within the virtual machine computing environment by reference to the page table 283, which can comprise an entry, such as the entry 631, which can correlate the requested region 611 with the corresponding region 621 in the guest physical memory 312, and (2) the page table lookup performed on the host computing device by reference to the SLAT 220, which can comprise an entry, such as the entry 691, which can correlate the region 621 in the guest physical memory 312 to the region 661 in the host physical memory 322, thereby completing a path to the relevant data as stored in the host's physical memory.

As also detailed above, the various page tables, such as the exemplary page table 283 in the virtual memory computing environment, the exemplary page table 250 on the host computing device, and the exemplary SLAT 220, can comprise hierarchically arranged layers of tables such that entries in the hierarchically lowest layer of tables can identify "small pages" of memory, as that term is explicitly defined herein, which can be the smallest range of memory addresses that can be individually and discreetly maintained and operated upon by the processes utilizing the respective page tables. In the exemplary system 600 shown in FIG. 6, the various page table entries (PTEs) 631, 671 and 691 can be at that lowest layer of tables such that the regions 611, 621, 641 and 661 can be small pages of memory. As detailed above, in one common microprocessor architecture, such small pages of memory, as that term is explicitly defined herein, can comprise 4 KB of contiguous memory addresses.

According to one aspect, to increase the speed and efficiency of memory access from a virtual machine computing environment whose physical memory is backed by virtual memory of a host computing device, the SLAT 220 can maintain correlations at hierarchically higher layers of tables. In other words, the SLAT 220 can correlate "large pages" of memory or "huge pages" of memory, as those terms are explicitly defined herein. In one common microprocessor architecture, large pages of memory, as that term is explicitly defined herein, can comprise 2 MB of contiguous memory addresses, and huge pages of memory, as that term is explicitly defined herein, can comprise 1 GB of contiguous memory addresses. Again, as indicated previously, the terms "small page", "large page" and "huge page" are explicitly defined with reference to the hierarchical layer, within a hierarchically arranged set of page tables, and are not defined based on a specific quantity of memory, since such quantities of memory can vary as between different microprocessor architectures, operating system architectures, and the like.

Figure 7:
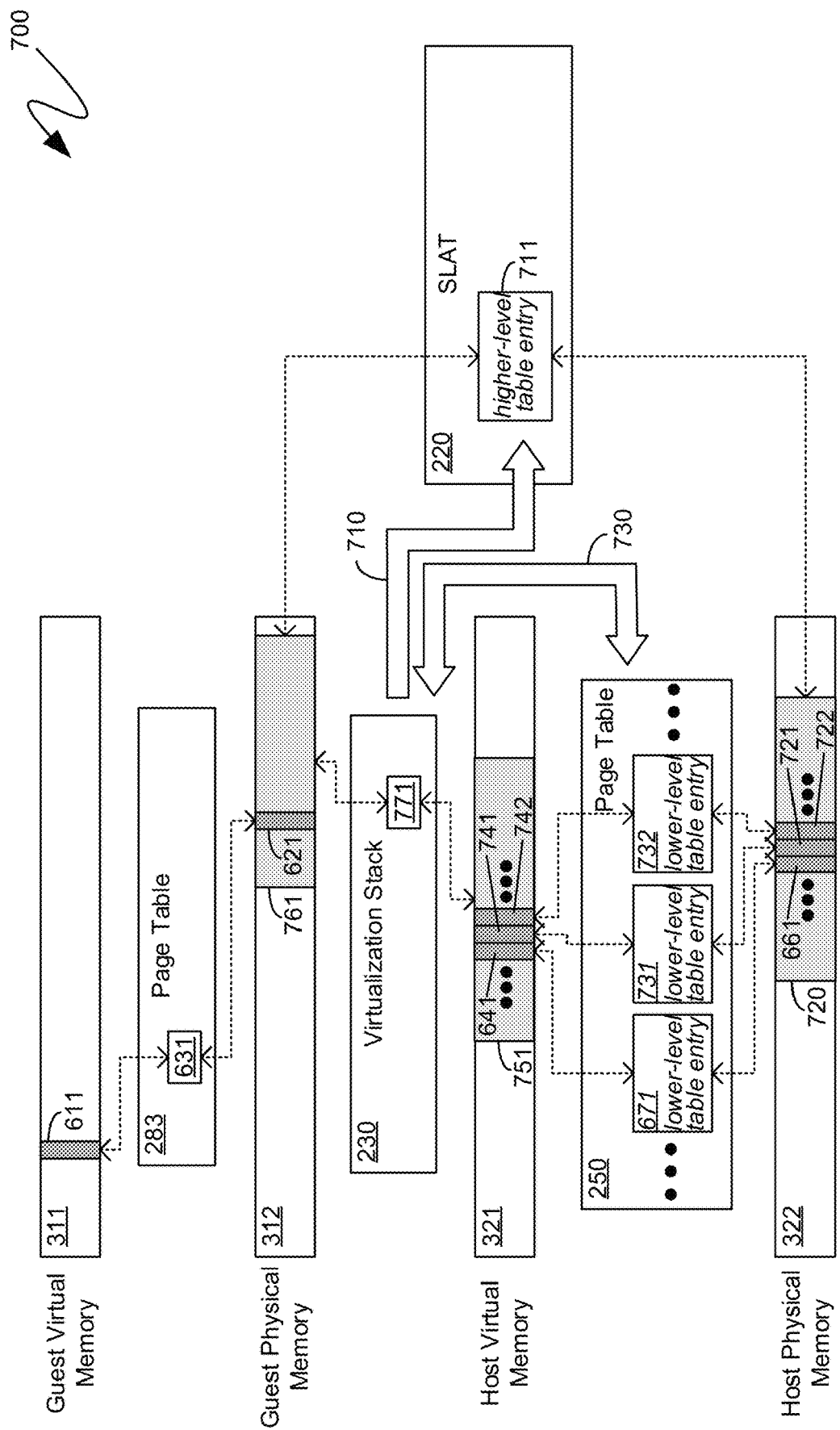
FIG. 7 is a block diagram illustrating an exemplary mechanism for more efficiently translating between guest physical memory and host physical memory while backing guest physical memory with host virtual memory.

Turning to FIG. 7, one mechanism for creating large page entries in the SLAT 220, and thereby increasing the speed and efficiency of memory access from a virtual machine computing environment whose physical memory is backed by virtual memory of a host computing device, is shown. As in FIG. 6, in the system 700, shown in FIG. 7, the guest virtual memory 311, guest physical memory 312, host virtual memory 321 and host physical memory 322 are illustrated as rectangular blocks whose width represents a range of memory. Additionally, the accessing of the region 611 can proceed in the manner detailed above, and shown in FIG. 6. However, rather than generating a hierarchically lowest-level table entry within the SLAT 220, the mechanisms described herein can generate a higher-level table entry, such as the exemplary table entry 711. As detailed above, such a higher-level table entry can correlate large pages, or huge pages, of memory. Accordingly, when the virtualization stack 230 causes the table entry 711 to be entered into the SLAT 220, the table entry 711 can correlate a large page sized region 761 of the guest physical memory 312, to a large page sized region 720 of the host physical memory 322. As will be detailed below, however, such large page sized regions are not large pages from the perspective of the memory manager executing on the host computing device, and utilizing the page table 250, and, as a result, such large page sized regions are not, for example, paged out as a single large page, or otherwise treated as a single, indivisible large page by the memory manager executing on the host computing device.

To the contrary, so as to maintain the advantages of efficiency, density, and the other advantages provided by the mechanisms detailed above that enable guest physical memory, such as exemplary guest physical memory 312, to be backed by host virtual memory, such as exemplary host virtual memory 321, the page table 250, executing on the host, can comprise, not a higher-level table entry analogous to the higher-level table entry 711 in the SLAT 220, but rather can simply comprise lower-level table entries, such as the exemplary lower-level table entries 671, 731 and 732, shown in FIG. 7. More specifically, a specific set of lower-level table entries in the page table 250, such as the exemplary lower-level table entries 671, 731, 732 and so on, can identify contiguous ranges of host physical memory 322 such that the aggregate contiguous range of host physical memory 322 identified by the entire equivalent sequence of lower-level table entries in the page table 250 encompasses the same range of memory as the single higher-level table entry 711 in the SLAT 220. Thus, as one example, in a microprocessor architecture where small pages are 4 KB in size and large pages are 2 MB in size, 512 contiguous small page entries in the page table 250 can, in aggregate, identify a contiguous 2 MB of the host physical memory 322.

Because a virtual fault may have been generated for less than a large page sized memory region, only specific ones of the lower-level table entries, such as the exemplary lower-level table entries 671, 731 and 732, may be utilized, while the remaining lower-level table entries may remain marked as free memory. For example, an application executing within a virtual machine computing environment utilizing the guest physical memory 312 may initially only require one small page sized amount of memory. In such an instance, the single higher level table entry 711 may identify a large page sized region of memory, such as the large page sized region 720, as being utilized. However, from the perspective of the memory manager of the host computing device, referencing the page table 250, only a single one of the lower level table entries, such as the exemplary lower level table entry 671, may be indicated as being utilized, with the rest being indicate as being available. To prevent the other entries from being treated as available, the virtualization stack 230 can mark the remaining lower level table entries, such as the exemplary lower-level table entries 731, 732, etc. as also being used. When the application executing within the virtual machine computing environment then needs to utilize additional small page sized amounts of memory, the virtualization stack 230 can utilize the memory location previously indicated as being used, but which have not, in fact, yet been utilized by the application executing within the virtual machine computing environment, to satisfy the application's further memory needs.

According to one aspect, the tracking of the equivalent sequence of lower-level table entries in the page table 250, such as the aforementioned marking, can be coordinated by the virtualization stack 230, as illustrated by the action 730 in FIG. 7. In such an instance, if the memory manager executing on the host makes changes to one or more of those lower-level table entries, the virtualization stack 230 can trigger the appropriate changes to the corresponding entries in the SLAT 220, such as the higher-level table entry 711.

The sequence of lower-level table entries in the page table 250, that is equivalent to the higher-level table entry 711 in the SLAT 220, can correlate a sequence of host virtual memory ranges, such as the exemplary ranges 641, 741 and 742, to host physical memory ranges, such as the exemplary ranges 661, 721 and 722, respectively. Consequently, a large page sized region of host virtual memory 321, such as the exemplary large page sized region 751, is correlated to a large page sized region of host physical memory 322, such as the exemplary large page sized region 720, through the sequence of lower-level table entries in the page table 250, namely the exemplary lower-level table entries 671, 731, 732, etc. The virtualization stack 230 can maintain data structures, such as hierarchically arranged tables, which can coordinate host virtual memory locations to guest physical memory locations. Thus, the virtualization stack can maintain one or more data entries, such as the exemplary data entry 771, which can correlate the large paged size region 751 of the host virtual memory 321 to a corresponding large page sized region 761 of the guest physical memory 312. While the data entry 771 is illustrated as a single entry, the virtualization stack 230 can maintain the aforementioned correlation as a single entry, as multiple entries, such as by individually correlating sub-portions of the region 761 to the region 751, including sub-portions that are sized as small pages, or combinations thereof. To complete the cycle, the aforementioned higher-level table entry 711 in the SLAT 220 can then correlate the large page sized region 761, in the guest physical memory 312, to the large page sized region 720, in the host physical memory 322. Again, from the perspective of the SLAT 220, having only a single higher-level table entry 711, the large page sized regions 720 and 761 are large pages that are unitarily treated by the SLAT (as per the single higher-level table entry 711), while, from the perspective of the memory manager executing on the host, the page table 250 and, indeed, the virtualization stack 230, such regions are not unitary, but rather are composed of individually manageable small page regions identified by, for example, lower-level table entries in the page table 250.

The availability of contiguous small memory pages in the guest physical memory 312, equivalent to one or more large or huge memory pages, as those terms have been defined herein, can be straightforward because the guest physical memory 312 is perceived, by processes executing within the corresponding virtual machine computing environment, as being physical memory. Consequently, the descriptions below focus on the contiguity of the host physical memory 322. Additionally, because the guest physical memory 312 is perceived as being physical memory, full memory access permissions (such as "read/write/execute" permissions) remain across the entire range of the guest physical memory 312, and, accordingly, it is unlikely that there will be discontinuity of memory access permissions among the lower-level table entries in the page table 250.

Focusing on the page table 250 of the host computing device, if one or more large page sized regions of host physical memory 322 remain unused, then, according to one aspect, when a virtual fault, as detailed above, is triggered on a small page within a range of memory delineated into a large page sized region that remains unused, the remaining small pages within that large page sized region, a single higher-level table entry, such as the exemplary higher-level table entry 711, can be generated in the SLAT 220.

However, because the large page 720, corresponding to the higher-level table entry 711, is, from the perspective of the page table 250, a sequence of small pages, such as the exemplary small pages 661, 721, 722, etc., due to the sequence of lower-level table entries, such as the exemplary lower-level table entries 671, 731, 732, etc., the memory management mechanisms utilizing such a page table 250 can treat each of the small pages individually, which can include paging such small pages to a non-volatile storage medium, such as a hard disk drive. In such an instance, according to one aspect, the higher-level table entry 711, in the SLAT 220, can be replaced by an equivalent sequence of lower-level table entries. More specifically, the lower-level table entries generated within the SLAT 220 can be contiguous and can, in aggregate, reference the same range of memory addresses as the higher-level table entry 711, with the exception that specific ones of the lower-level table entries, corresponding to pages that were paged out by the memory manager, can be missing, or otherwise not created.

According to other aspects, if a large page, or huge page, sized region of host physical memory 322 is unavailable at a time when a virtual fault, as detailed above, is triggered, an available large page, or huge page, sized region of host physical memory can be constructed at intercept time by assembling an appropriate quantity of contiguous small pages. For example, a large page sized region can be constructed from contiguous small pages that are available from a "free list", or other like enumeration of available host physical memory pages. As another example, if small pages that are currently being utilized by other processes are required in order to establish the continuity necessary to assemble a sufficient quantity of small pages into one large page sized region, those small pages can be obtained from such other processes, and the data contained therein can be transferred to other small pages, or can be paged out to disk. Once such a large page sized region is constructed, processing of the virtual fault can proceed in the manner detailed above, including the generation of a higher-level table entry, such as the exemplary higher-level table entry 711, in the SLAT 220.

In some instances, a memory manager executing on the host computing device, in utilizing the page table 250, may implement background, or opportunistic, mechanisms by which available large page, or huge page, sized regions are constructed from a sufficient quantity of contiguous small pages. To the extent that such mechanisms result in an available large page sized region, for example, when a virtual fault is triggered, processing can proceed in the manner indicated above. However, to the extent that such mechanisms have not yet completed assembling an available large page sized region, the construction of such a large page sized region can be completed at intercept time with a higher priority. For example, a process constructing such a large page sized region can be given a higher execution priority, or can be moved from the background to the foreground, or can otherwise be executed more aggressively.

Alternatively, if a large page sized region of host physical memory is unavailable when a virtual fault is triggered, processing can proceed as detailed above with the utilization of multiple small pages. Subsequently, when a large page sized region becomes available, data from the multiple small pages previously utilized (due to the unavailability of a large page sized region at the time) can be copied over to the large page, and the previously utilized small pages can be subsequently freed. In such an instance, the lower-level table entries in the SLAT 220 can be replaced with one higher-level table entry, such as exemplary higher-level table entry 711.

Additionally, the parameters under which large page sized regions are constructed, whether at intercept time or opportunistically, can be varied in accordance with a balance between faster memory access, due to the skipping of hierarchical layers of tables during a SLAT lookup, and the initial delay in constructing a large page sized region from small pages. One such parameter can be a quantity of contiguous small pages sufficient to trigger trading, or paging out, of other small pages necessary to complete the contiguity across an entire large page sized region. For example, if 512 contiguous small pages are required to construct a large page and contiguous ranges of 200 small pages and 311 small pages exist, with one small page between them being currently utilized by another process, such a small page can be paged out, or traded with another available small page, so that all 512 contiguous small pages can be available to be constructed into one large page sized region. In such an example, the fragmentation of the available small pages can be very low. By contrast, contiguous ranges of only 20-30 small pages that are continually interrupted by other small pages that are currently being utilized by other processes can describe a range of small pages that has a very high fragmentation. While such a highly fragmented set of small pages can still be traded, paged out, or otherwise reshuffled to generate a contiguous range of small pages equivalent to a large page sized region, such effort may take substantially longer. Accordingly, according to one aspect, a fragmentation threshold can be set, which can delineate whether efforts are undertaken to construct a large page sized region from ranges of small pages having higher or lower fragmentation.

According to one aspect, the construction of a large page sized region can take advantage of existing utilizations of small pages by processes whose memory is being utilized to back the guest physical memory of virtual machine computing environments. As a simple example, if contiguous ranges of 200 small pages and 311 small pages have already been utilized by the process whose memory backs the guest physical memory 312, and only one small page between those two contiguous ranges is needed to establish a contiguous range of small pages equivalent to a large page, then, once such that small page is freed, such as by being paged out or traded, the only data that needs to be copied can be the data corresponding to that one small page, with the remaining data able to stay in place, even though the corresponding lower-level table entries in the SLAT 220 can be invalidated and replaced with a single higher-level table entry encompassing the same range of memory.

To avoid having to reconstruct large page sized regions of memory from contiguous ranges of small pages, an existing set of contiguous lower-level table entries in the page table 250 that encompass, in aggregate, an equivalent memory range as the single higher-level table entry 711 in the SLAT 220, can be locked so that they can avoid being paged out. Thus, for example, the virtualization stack 230 can request that the lower-level table entries 671, 731, 732, etc. be locked so that the corresponding ranges of host physical memory 661, 721, 722, etc. can retain the data stored in them, without it being paged to disk. According to one aspect, the decision, such as by the virtualization stack 230, to request that such entries be locked can be dependent upon various factors. For example, one such factor can be a frequency of utilization of the data stored within those memory ranges, with more frequently utilized data resulting in the entries being locked, and less frequently utilized data resulting in the entries being subsequently unlocked. Other factors, such as a quantity of memory fragmentation of the overall system, a need for greater density of virtual machine computing environments on the host computing device, and other like factors can equally be referenced in deciding whether to request that page table entries, supporting a higher-level table entry within the SLAT, be locked.

Figure 8:
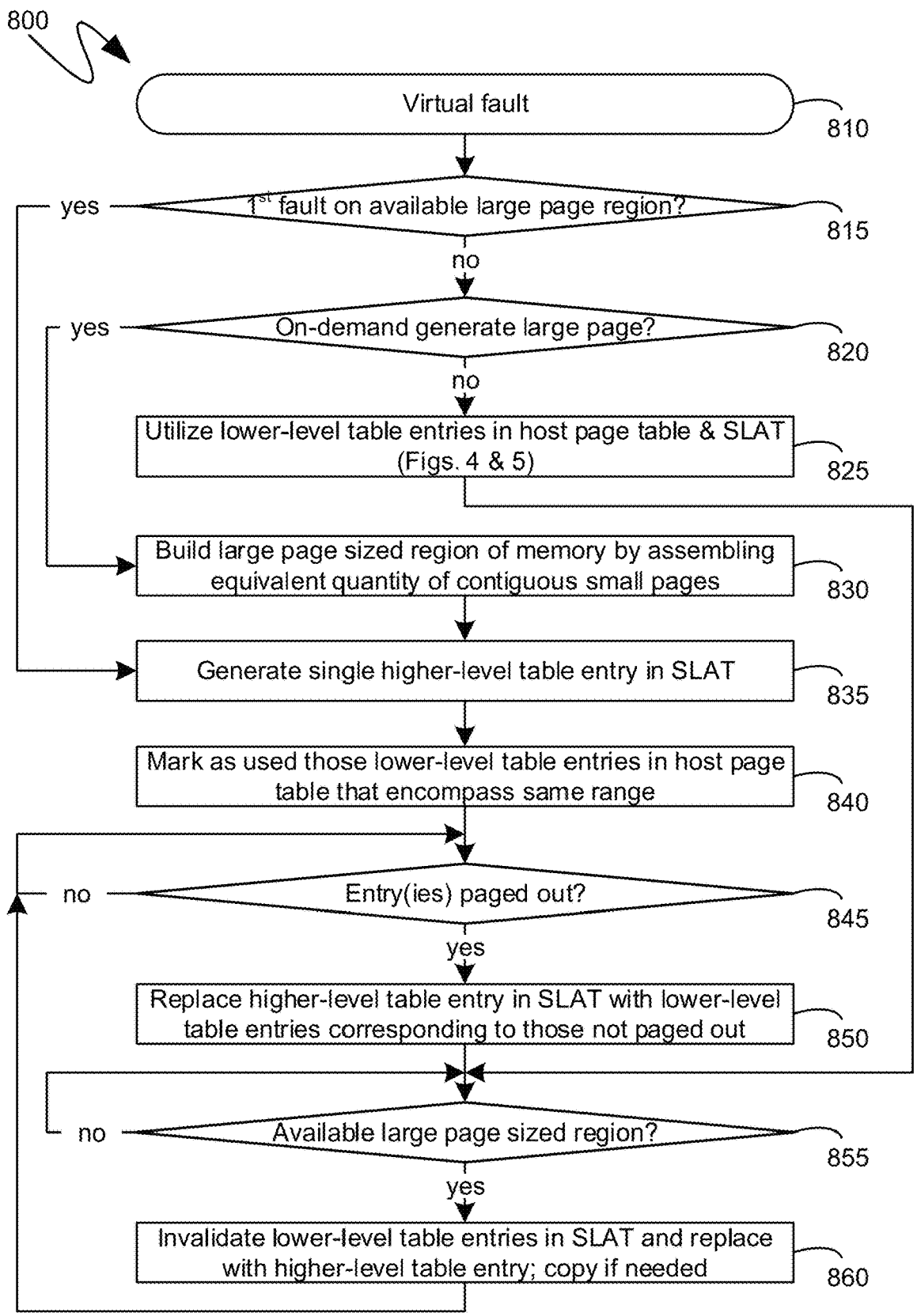
FIG. 8 is a flow diagram illustrating an exemplary method for more efficiently translating between guest physical memory and host physical memory while backing guest physical memory with host virtual memory.

Turning to FIG. 8, the flow diagram 800 shown therein illustrates the above described mechanisms as an exemplary series of steps. Initially, at step 810, a virtual fault, as detailed above, can occur. Subsequently, at step 815, a determination can be made as to whether the virtual fault of step 810 references memory within a large page sized region of memory, where no other memory within that large page sized region has been previously referenced by a virtual fault. In particular, host physical memory can be delineated into segments of large page size. The first virtual fault referencing memory within one large page sized region can result in a positive determination at step 815, whereby processing can proceed to step 835.

At step 835, a single higher-level table entry can be generated in the SLAT, while, correspondingly, at step 840, multiple lower-level table entries can be utilized in the host page table, where a relevant quantity of multiple lower-level table entries is that which encompasses the same range of memory as the single higher-level table entry generated in the SLAT, namely the range of memory corresponding to the large page sized delineate region of memory containing the memory location whose access triggered the virtual fault at step 810. As indicated previously, because the host page table comprises multiple lower-level table entries, as opposed to a single higher-level table entry, memory management of the host computing device may choose to page out, such as by copying their contents to disk, one or more of the memory regions, or pages, identified by such lower-level table entries in the host page table. If such paging out occurs, as determined at step 845, processing can proceed to step 850, and the higher-level table entry in the SLAT can be replaced with multiple lower-level table entries corresponding to the memory regions referenced by the lower-level table entries in the host page table that were not paged out (and leaving out of the SLAT those level table entries corresponding to the memory regions referenced by the lower-level table entries in the host page table that were, in fact, paged out).

According to one aspect, if small pages from the large page sized region of memory were paged out at step 845, and the higher-level table entry in the SLAT was invalidated and replaced with a corresponding sequence of lower-level table entries (with the exception of any lower-level table entries referencing the paged-out small pages), then, optionally, processing can proceed to step 855 to continue to check for available large page sized regions of memory that become free. As detailed above, memory management processes executing on the host computing device, for example, can opportunistically reconstruct large page sized regions of available memory. Should such large page sized regions of memory become available, as determined at step 855, processing can proceed to step 860, where the lower-level table entries in the SLAT can be replaced with a single higher-level table entry in the SLAT and, if appropriate, data can be copied from the regions of memory referenced by the prior lower-level table entries to the regions of memory now referenced by the single higher-level table entry (if the two regions of memory are different).

Turning back to step 815, if the virtual fault of step 810 was not the first one to reference memory within a previously delineated large page sized region, processing can proceed to step 820. At step 820, a determination can be made as to whether a large page should be created at intercept time, such as in the manner detailed above. More specifically, if the steps 835 and 840 were previously performed for a large page sized region of memory, and the SLAT now comprises a single higher-level table entry, while the page table comprises equivalent lower-level table entries referencing sub-portions of the memory region referenced by the single higher-level table entry in the SLAT, then a subsequent memory access directed to any memory locations within the memory region referenced by the single higher-level table entry in the SLAT would not trigger a virtual fault, as detailed above. Thus, if a virtual fault is triggered at step 810, and, at step 815, it is determined that the virtual fault is not the first directed to memory locations within a previously delineated large page sized region of memory, then the virtual fault triggered at step 810 was likely triggered because steps 835 and 840 were previously performed for memory locations within that large page sized region, but, subsequently, one or more of the small pages that comprise that large page sized region of memory were paged out, as determined at step 845, and, consequently, the step 850 was previously performed. Thus, at step 820, a determination can be made as to whether a large page sized region of memory should be constructed at intercept time. If such a large page sized region should be constructed, then processing can proceed to step 830 and an appropriate quantity of contiguous small pages can be assembled, as detailed above. Processing can then proceed with step 835 as before. Conversely, if, at step 830, no such on demand construction of large page sized regions of available memory is requested, processing can proceed to utilize lower-level table entries in the host page table and the SLAT in accordance with the mechanisms described in detail above with reference to FIGS. 4 and 5.

The descriptions above include, as a first example a method of increasing a speed of access of computer memory, the method comprising: detecting a first memory access, from a first process executing in a virtual machine computing environment, directed to a first range of memory; generating, as a precondition to completing the first memory access, a first entry in a hierarchically arranged second layer address translation table, the hierarchically arranged second layer address translation table correlating host physical memory addresses to guest physical memory addresses, the first entry being at least one hierarchical level above a hierarchically lowest level of tables such that a second range of memory, identified by the first entry, can be identified without reference to any table in the hierarchically lowest level of tables, the second range of memory being greater than the first range of memory; and in response to generating the first entry in the hierarchically arranged second layer address translation table, marking as used a first plurality of entries in a hierarchically arranged page table, the hierarchically arranged page table correlating the host physical memory addresses to host virtual memory addresses, the first plurality of entries referencing, in aggregate, the same second range of memory as the first entry in the hierarchically arranged second layer address translation table, wherein entries of the first plurality of entries are at a hierarchically lowest level of tables; wherein the guest physical memory addresses are perceived as being addresses to physical memory by processes executing within the virtual machine computing environment; wherein the host physical memory addresses are addresses to actual physical memory of a host computing device hosting the virtual machine computing environment; wherein the host virtual memory addresses are addresses to virtual memory provided by a memory manager executing on the host computing device, the memory manager utilizing the hierarchically arranged page table to provide the virtual memory; and wherein guest physical memory, identified by the guest physical memory addresses, is backed by a portion of host virtual memory, identified by a portion of the host virtual memory addresses.

A second example is the method of the first example, further comprising: detecting a second memory access from the first process executing in the virtual machine computing environment, the second memory access being directed to a third range of memory that differs from the first range of memory; and satisfying the second memory access by reference to a second subset of the first plurality of entries in the hierarchically arranged page table; wherein the first memory access was satisfied by reference to a first subset of the first plurality of entries in the hierarchically arranged page table, the first subset comprising different entries, in the hierarchically arranged page table, than the second subset.

A third example is the method of the first example, further comprising: detecting, after the first memory access completes, that a first subset of the first plurality of entries in the hierarchically arranged page table have had data, that was originally stored in corresponding host physical memory addresses, subsequently paged out to a non-volatile storage medium; invalidating, in response to the detecting, the first entry in the hierarchically arranged second layer address translation table; and generating, in place of the first entry in the hierarchically arranged second layer address translation table, a second plurality of entries in the hierarchically arranged second layer address translation table, the second plurality of entries referencing, in aggregate, at least some of the same second range of memory as the first entry, wherein entries of the second plurality of entries are at a hierarchically lowest level of tables.

A fourth example is the method of the third example, wherein the second plurality of entries references portions of the second range of memory that were previously accessed by the first process and were not paged out.

A fifth example is the method of the first example, further comprising: assembling a first plurality of contiguous small page sized regions of the host physical memory into a single large page sized region of the host physical memory.

A sixth example is the method of the fifth example, wherein the assembling occurs subsequent to the detecting the first memory access and prior to the generating the first entry in the hierarchically arranged second layer address translation table.

A seventh example is the method of the fifth example, further comprising: generating a second entry in the hierarchically arranged second layer address translation table, the second entry being at the least one hierarchical level above the hierarchically lowest level of tables such that a third range of memory, identified by the second entry, can be identified without reference to any table in the hierarchically lowest level of tables, the third range of memory referencing the single large page sized region of the host physical memory into which the first plurality of the contiguous small page sized regions of the host physical memory were assembled; and in response to generating the second entry in the hierarchically arranged second layer address translation table, marking as used a second plurality of entries in the hierarchically arranged page table, the second plurality of entries referencing the first plurality of the contiguous small page sized regions of the host physical memory which were assembled into the single large page sized region of the host physical memory.

An eighth example is the method of the seventh example, further comprising: generating a second entry in the hierarchically arranged second layer address translation table, the second entry being at the least one hierarchical level above the hierarchically lowest level of tables such that a third range of memory, identified by the second entry, can be identified without reference to any table in the hierarchically lowest level of tables, the third range of memory referencing the single large page sized region of the host physical memory into which the first plurality of the contiguous small page sized regions of the host physical memory were assembled; and in response to generating the second entry in the hierarchically arranged second layer address translation table, marking as used a second plurality of entries in the hierarchically arranged page table, the second plurality of entries referencing the first plurality of the contiguous small page sized regions of the host physical memory which were assembled into the single large page sized region of the host physical memory.

A ninth example is the method of the seventh example, further comprising: copying data from a second set of one or more small page sized regions of the host physical memory to at least a portion of the first plurality of the contiguous small page sized regions; and invalidating a second plurality of entries in the hierarchically arranged second layer address translation table, the second plurality of entries comprising both: (1) a first subset of entries that reference the second set of the one or more small page sized regions of the host physical memory and (2) a second subset of entries that reference at least some of the first plurality of contiguous small page sized regions of the host physical memory, wherein entries of the second plurality of entries are at a hierarchically lowest level of tables; wherein the generated second entry in the hierarchically arranged second layer address translation table is utilized in place of the second plurality of entries that were invalidated.

A tenth example is the method of the fifth example, wherein the assembling the first plurality of contiguous small page sized regions of the host physical memory comprises copying data from some of the first plurality of contiguous small page sized regions to other small page sized regions of the host physical memory that differ from the first plurality of contiguous small page sized regions.

An eleventh example is the method of the tenth example, wherein the copying the data from the some of the first plurality of contiguous small page sized regions to the other small page sized regions is only performed if a fragmentation of the first plurality of contiguous small page sized regions is below a fragmentation threshold.

A twelfth example is the method of the first example, further comprising: preventing paging of the second range of memory.

A thirteenth example is the method of the twelfth example, wherein the preventing the paging of the second range of memory is only performed if one or more portions of the second range of memory are accessed more frequently than an access frequency threshold.

A fourteenth example is the method of the twelfth example, further comprising removing the prevention of paging of the second range of memory if one or more portions of the second range of memory are accessed less frequently than an access frequency threshold.

A fifteenth example is the method of the first example, wherein the second range of memory is 2 MB in size.

A sixteenth example is a computing device comprising: one or more central processing units; random access memory (RAM); and one or more computer-readable media comprising: a first set of computer-executable instructions, which, when executed by the computing device, cause the computing device to provide a memory manager referencing a hierarchically arranged page table to translate host virtual memory addresses to host physical memory addresses that identify locations on the RAM; a second set of computer-executable instructions, which, when executed by the computing device, cause the computing device to provide a virtual machine computing environment, wherein processes executing within the virtual machine computing environment perceive guest physical memory addresses as being addresses to physical memory, and wherein further guest physical memory, identified by the guest physical memory addresses, is backed by a portion of host virtual memory, identified by a portion of the host virtual memory addresses; and a third set of computer-executable instructions, which, when executed by the computing device, cause the computing device to: detect a first memory access, from a first process executing in the virtual machine computing environment, directed to a first range of memory; generate, as a precondition to completing the first memory access, a first entry in a hierarchically arranged second layer address translation table, the hierarchically arranged second layer address translation table correlating the host physical memory addresses to the guest physical memory addresses, the first entry being at least one hierarchical level above a hierarchically lowest level of tables such that a second range of memory, identified by the first entry, can be identified without reference to any table in the hierarchically lowest level of tables, the second range of memory being greater than the first range of memory; and in response to generating the first entry in the hierarchically arranged second layer address translation table, mark as used a first plurality of entries in the hierarchically arranged page table, the first plurality of entries referencing, in aggregate, the same second range of memory as the first entry in the hierarchically arranged second layer address translation table, wherein entries of the first plurality of entries are at a hierarchically lowest level of tables.

A seventeenth example is the computing device of the sixteenth example, wherein the third set of computer-executable instructions comprises further computer-executable instructions, which, when executed by the computing device, cause the computing device to: detect, after the first memory access completes, that a first subset of the first plurality of entries in the hierarchically arranged page table have had data, that was originally stored in corresponding host physical memory addresses, subsequently paged out to a non-volatile storage medium; invalidate, in response to the detecting, the first entry in the hierarchically arranged second layer address translation table; and generate, in place of the first entry in the hierarchically arranged second layer address translation table, a second plurality of entries in the hierarchically arranged second layer address translation table, the second plurality of entries referencing, in aggregate, at least some of the same second range of memory as the first entry, wherein entries of the second plurality of entries are at a hierarchically lowest level of tables.

An eighteenth example is the computing device of the sixteenth example, wherein the third set of computer-executable instructions comprises further computer-executable instructions, which, when executed by the computing device, cause the computing device to: assemble a first plurality of contiguous small page sized regions of the host physical memory into a single large page sized region of the host physical memory; wherein the assembling occurs subsequent to the detecting the first memory access and prior to the generating the first entry in the hierarchically arranged second layer address translation table.

A nineteenth example is the computing device of the sixteenth example, wherein the third set of computer-executable instructions comprises further computer-executable instructions, which, when executed by the computing device, cause the computing device to: prevent paging of the second range of memory.

A twentieth example is one or more computer-readable storage media comprising computer-executable instructions, which when executed, cause a computing device to: detect a first memory access, from a first process executing in a virtual machine computing environment, directed to a first range of memory; generate, as a precondition to completing the first memory access, a first entry in a hierarchically arranged second layer address translation table, the hierarchically arranged second layer address translation table correlating host physical memory addresses to guest physical memory addresses, the first entry being at least one hierarchical level above a hierarchically lowest level of tables such that a second range of memory, identified by the first entry, can be identified without reference to any table in the hierarchically lowest level of tables, the second range of memory being greater than the first range of memory; and in response to generating the first entry in the hierarchically arranged second layer address translation table, mark as used a first plurality of entries in a hierarchically arranged page table, the hierarchically arranged page table correlating the host physical memory addresses to host virtual memory addresses, the first plurality of entries referencing, in aggregate, the same second range of memory as the first entry in the hierarchically arranged second layer address translation table, wherein entries of the first plurality of entries are at a hierarchically lowest level of tables; wherein the guest physical memory addresses are perceived as being addresses to physical memory by processes executing within the virtual machine computing environment; wherein the host physical memory addresses are addresses to actual physical memory of a host computing device hosting the virtual machine computing environment; wherein the host virtual memory addresses are addresses to virtual memory provided by a memory manager executing on the host computing device, the memory manager utilizing the hierarchically arranged page table to provide the virtual memory; and wherein guest physical memory, identified by the guest physical memory addresses, is backed by a portion of host virtual memory, identified by a portion of the host virtual memory addresses.

As can be seen from the above descriptions, mechanisms by which memory access through a SLAT can be accelerated have been described. In view of the many possible variations of the subject matter described herein, we claim as our invention all such embodiments as may come within the scope of the following claims and equivalents thereto.

We claim:

1. A method of increasing a speed of access of computer memory, the method comprising:
    detecting a first memory access, from a first process executing in a virtual machine computing environment, directed to a first range of memory;
    generating, as a precondition to completing the first memory access, a first entry in a hierarchically arranged second layer address translation table, the hierarchically arranged second layer address translation table correlating host physical memory addresses to guest physical memory addresses, the first entry being at least one hierarchical level above a hierarchically lowest level of tables such that a second range of memory, identified by the first entry, can be identified without reference to any table in the hierarchically lowest level of tables, the second range of memory being greater than the first range of memory; and
    in response to generating the first entry in the hierarchically arranged second layer address translation table, marking as used a first plurality of entries in a hierarchically arranged page table, the hierarchically arranged page table correlating the host physical memory addresses to host virtual memory addresses, the first plurality of entries referencing, in aggregate, the same second range of memory as the first entry in the hierarchically arranged second layer address translation table, wherein entries of the first plurality of entries are at a hierarchically lowest level of tables;
    wherein the guest physical memory addresses are perceived as being addresses to physical memory by processes executing within the virtual machine computing environment;
    wherein the host physical memory addresses are addresses to actual physical memory of a host computing device hosting the virtual machine computing environment;
    wherein the host virtual memory addresses are addresses to virtual memory provided by a memory manager executing on the host computing device, the memory manager utilizing the hierarchically arranged page table to provide the virtual memory; and
    wherein guest physical memory, identified by the guest physical memory addresses, is backed by a portion of host virtual memory, identified by a portion of the host virtual memory addresses.

2. The method of claim 1, further comprising:
    detecting a second memory access from the first process executing in the virtual machine computing environment, the second memory access being directed to a third range of memory that differs from the first range of memory; and
    satisfying the second memory access by reference to a second subset of the first plurality of entries in the hierarchically arranged page table;
    wherein the first memory access was satisfied by reference to a first subset of the first plurality of entries in the hierarchically arranged page table, the first subset comprising different entries, in the hierarchically arranged page table, than the second subset.

3. The method of claim 1, further comprising:
    detecting, after the first memory access completes, that a first subset of the first plurality of entries in the hierarchically arranged page table have had data, that was originally stored in corresponding host physical memory addresses, subsequently paged out to a nonvolatile storage medium;
    invalidating, in response to the detecting, the first entry in the hierarchically arranged second layer address translation table; and
    generating, in place of the first entry in the hierarchically arranged second layer address translation table, a second plurality of entries in the hierarchically arranged second layer address translation table, the second plurality of entries referencing, in aggregate, at least some of the same second range of memory as the first entry, wherein entries of the second plurality of entries are at a hierarchically lowest level of tables.

4. The method of claim 3, wherein the second plurality of entries references portions of the second range of memory that were previously accessed by the first process and were not paged out.

5. The method of claim 1, further comprising:
    assembling a first plurality of contiguous small page sized regions of the host physical memory into a single large page sized region of the host physical memory.

6. The method of claim 5, wherein the assembling occurs subsequent to the detecting the first memory access and prior to the generating the first entry in the hierarchically arranged second layer address translation table.

7. The method of claim 5, further comprising:
    generating a second entry in the hierarchically arranged second layer address translation table, the second entry being at the least one hierarchical level above the hierarchically lowest level of tables such that a third range of memory, identified by the second entry, can be identified without reference to any table in the hierarchically lowest level of tables, the third range of memory referencing the single large page sized region of the host physical memory into which the first plurality of the contiguous small page sized regions of the host physical memory were assembled; and
    in response to generating the second entry in the hierarchically arranged second layer address translation table, marking as used a second plurality of entries in the hierarchically arranged page table, the second plurality of entries referencing the first plurality of the contiguous small page sized regions of the host physical memory which were assembled into the single large page sized region of the host physical memory.

8. The method of claim 7, further comprising:
    copying data from a second plurality of small page sized regions of the host physical memory to at least a portion of the first plurality of the contiguous small page sized regions, the second plurality of small page sized regions being at least partly discontinuous; and
    invalidating a second plurality of entries in the hierarchically arranged second layer address translation table that referenced the second plurality of small page sized regions of the host physical memory, wherein entries of the second plurality of entries are at a hierarchically lowest level of tables;
    wherein the generated second entry in the hierarchically arranged second layer address translation table is utilized in place of the second plurality of entries that were invalidated.

9. The method of claim 7, further comprising:
    copying data from a second set of one or more small page sized regions of the host physical memory to at least a portion of the first plurality of the contiguous small page sized regions; and
    invalidating a second plurality of entries in the hierarchically arranged second layer address translation table, the second plurality of entries comprising both: (1) a first subset of entries that reference the second set of the one or more small page sized regions of the host physical memory and (2) a second subset of entries that reference at least some of the first plurality of contiguous small page sized regions of the host physical memory, wherein entries of the second plurality of entries are at a hierarchically lowest level of tables;
wherein the generated second entry in the hierarchically arranged second layer address translation table is utilized in place of the second plurality of entries that were invalidated.

10. The method of claim 5, wherein the assembling the first plurality of contiguous small page sized regions of the host physical memory comprises copying data from some of the first plurality of contiguous small page sized regions to other small page sized regions of the host physical memory that differ from the first plurality of contiguous small page sized regions.

11. The method of claim 10, wherein the copying the data from the some of the first plurality of contiguous small page sized regions to the other small page sized regions is only performed if a fragmentation of the first plurality of contiguous small page sized regions is below a fragmentation threshold.

12. The method of claim 1, further comprising:
preventing paging of the second range of memory.

13. The method of claim 12, wherein the preventing the paging of the second range of memory is only performed if one or more portions of the second range of memory are accessed more frequently than an access frequency threshold.

14. The method of claim 12, further comprising removing the prevention of paging of the second range of memory if one or more portions of the second range of memory are accessed less frequently than an access frequency threshold.

15. The method of claim 1, wherein the second range of memory is 2 MB in size.

16. A computing device comprising:
one or more central processing units;
random access memory (RAM); and
one or more computer-readable media comprising:
a first set of computer-executable instructions, which, when executed by the computing device, cause the computing device to provide a memory manager referencing a hierarchically arranged page table to translate host virtual memory addresses to host physical memory addresses that identify locations on the RAM;
a second set of computer-executable instructions, which, when executed by the computing device, cause the computing device to provide a virtual machine computing environment, wherein processes executing within the virtual machine computing environment perceive guest physical memory addresses as being addresses to physical memory, and wherein further guest physical memory, identified by the guest physical memory addresses, is backed by a portion of host virtual memory, identified by a portion of the host virtual memory addresses; and
a third set of computer-executable instructions, which, when executed by the computing device, cause the computing device to:
detect a first memory access, from a first process executing in the virtual machine computing environment, directed to a first range of memory;
generate, as a precondition to completing the first memory access, a first entry in a hierarchically arranged second layer address translation table, the hierarchically arranged second layer address translation table correlating the host physical memory addresses to the guest physical memory addresses, the first entry being at least one hierarchical level above a hierarchically lowest level of tables such that a second range of memory, identified by the first entry, can be identified without reference to any table in the hierarchically lowest level of tables, the second range of memory being greater than the first range of memory; and
in response to generating the first entry in the hierarchically arranged second layer address translation table, mark as used a first plurality of entries in the hierarchically arranged page table, the first plurality of entries referencing, in aggregate, the same second range of memory as the first entry in the hierarchically arranged second layer address translation table, wherein entries of the first plurality of entries are at a hierarchically lowest level of tables.

17. The computing device of claim 16, wherein the third set of computer-executable instructions comprises further computer-executable instructions, which, when executed by the computing device, cause the computing device to:
detect, after the first memory access completes, that a first subset of the first plurality of entries in the hierarchically arranged page table have had data, that was originally stored in corresponding host physical memory addresses, subsequently paged out to a non-volatile storage medium;
invalidate, in response to the detecting, the first entry in the hierarchically arranged second layer address translation table; and
generate, in place of the first entry in the hierarchically arranged second layer address translation table, a second plurality of entries in the hierarchically arranged second layer address translation table, the second plurality of entries referencing, in aggregate, at least some of the same second range of memory as the first entry, wherein entries of the second plurality of entries are at a hierarchically lowest level of tables.

18. The computing device of claim 16, wherein the third set of computer-executable instructions comprises further computer-executable instructions, which, when executed by the computing device, cause the computing device to:
assemble a first plurality of contiguous small page sized regions of the host physical memory into a single large page sized region of the host physical memory;
wherein the assembling occurs subsequent to the detecting the first memory access and prior to the generating the first entry in the hierarchically arranged second layer address translation table.

19. The computing device of claim 16, wherein the third set of computer-executable instructions comprises further computer-executable instructions, which, when executed by the computing device, cause the computing device to:
prevent paging of the second range of memory.

20. One or more computer-readable storage media comprising computer-executable instructions, which when executed, cause a computing device to:
detect a first memory access, from a first process executing in a virtual machine computing environment, directed to a first range of memory;

generate, as a precondition to completing the first memory access, a first entry in a hierarchically arranged second layer address translation table, the hierarchically arranged second layer address translation table correlating host physical memory addresses to guest physical memory addresses, the first entry being at least one hierarchical level above a hierarchically lowest level of tables such that a second range of memory, identified by the first entry, can be identified without reference to any table in the hierarchically lowest level of tables, the second range of memory being greater than the first range of memory; and in response to generating the first entry in the hierarchically arranged second layer address translation table, mark as used a first plurality of entries in a hierarchically arranged page table, the hierarchically arranged page table correlating the host physical memory addresses to host virtual memory addresses, the first plurality of entries referencing, in aggregate, the same second range of memory as the first entry in the hierarchically arranged second layer address translation table, wherein entries of the first plurality of entries are at a hierarchically lowest level of tables;

wherein the guest physical memory addresses are perceived as being addresses to physical memory by processes executing within the virtual machine computing environment;

wherein the host physical memory addresses are addresses to actual physical memory of a host computing device hosting the virtual machine computing environment;

wherein the host virtual memory addresses are addresses to virtual memory provided by a memory manager executing on the host computing device, the memory manager utilizing the hierarchically arranged page table to provide the virtual memory; and wherein guest physical memory, identified by the guest physical memory addresses, is backed by a portion of host virtual memory, identified by a portion of the host virtual memory addresses.

* * * * *